United States Patent
Kitao et al.

(10) Patent No.: US 7,251,507 B2
(45) Date of Patent: Jul. 31, 2007

(54) ON-VEHICLE HANDSFREE SYSTEM AND MOBILE TERMINAL THEREOF

(75) Inventors: Mitsuru Kitao, Kashiba (JP); Toshihiko Kurosaki, Kobe (JP); Takeshi Hatakeyama, Kobe (JP); Masaki Tomoda, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 732 days.

(21) Appl. No.: 09/948,766

(22) Filed: Sep. 10, 2001

(65) Prior Publication Data

US 2002/0032048 A1 Mar. 14, 2002

(30) Foreign Application Priority Data

Sep. 12, 2000 (JP) .............................. 2000-275989

(51) Int. Cl.
*H04M 1/00* (2006.01)
(52) U.S. Cl. ................................. 455/569.2; 455/575.9; 455/557; 455/556.1
(58) Field of Classification Search ............. 455/569.1, 455/569.2, 575.9, 557, 556.1
See application file for complete search history.

(56) References Cited

U.S. PATENT DOCUMENTS

| | | | |
|---|---|---|---|
| 5,485,504 A | 1/1996 | Ohnsorge | |
| 5,668,629 A * | 9/1997 | Parker et al. ........... | 356/139.05 |
| 5,732,074 A | 3/1998 | Spaur et al. | |
| 5,760,848 A | 6/1998 | Cho | |
| 5,867,794 A | 2/1999 | Hayes et al. | |
| 6,009,355 A | 12/1999 | Obradovich et al. | |
| 6,428,172 B1 * | 8/2002 | Hutzel et al. ................ | 359/838 |
| 6,542,076 B1 * | 4/2003 | Joao .......................... | 307/10.2 |
| 6,578,203 B1 * | 6/2003 | Anderson et al. ........... | 725/141 |
| 6,697,638 B1 * | 2/2004 | Larsson et al. .......... | 455/553.1 |
| 6,792,295 B1 * | 9/2004 | Hanevich et al. ......... | 455/569.1 |
| 2003/0096633 A1 * | 5/2003 | Goldberg ..................... | 455/556 |

FOREIGN PATENT DOCUMENTS

WO 98/57824 12/1998

\* cited by examiner

*Primary Examiner*—Duc M. Nguyen
*Assistant Examiner*—Aung T. Win
(74) *Attorney, Agent, or Firm*—Wenderoth, Lind & Ponack, L.L.P.

(57) ABSTRACT

A handsfree video phone system includes a video phone terminal and a car device in which a microphone, a speaker, and a camera are connected with an instrument panel via a cable. The video phone terminal is connected with the instrument panel via a wireless communication medium. When the video phone terminal is brought into the vehicle, the instrument panel informs the video phone terminal of the attribute information on the system structure. According to the attribute information, the video phone terminal switches the paths of multiplexed audio-video data so as to replace a microphone, a speaker, a camera, and a display that have been built in the video phone terminal with the microphone, the speaker, the camera, and a display of the instrument panel when the status changes to the communication status.

24 Claims, 16 Drawing Sheets

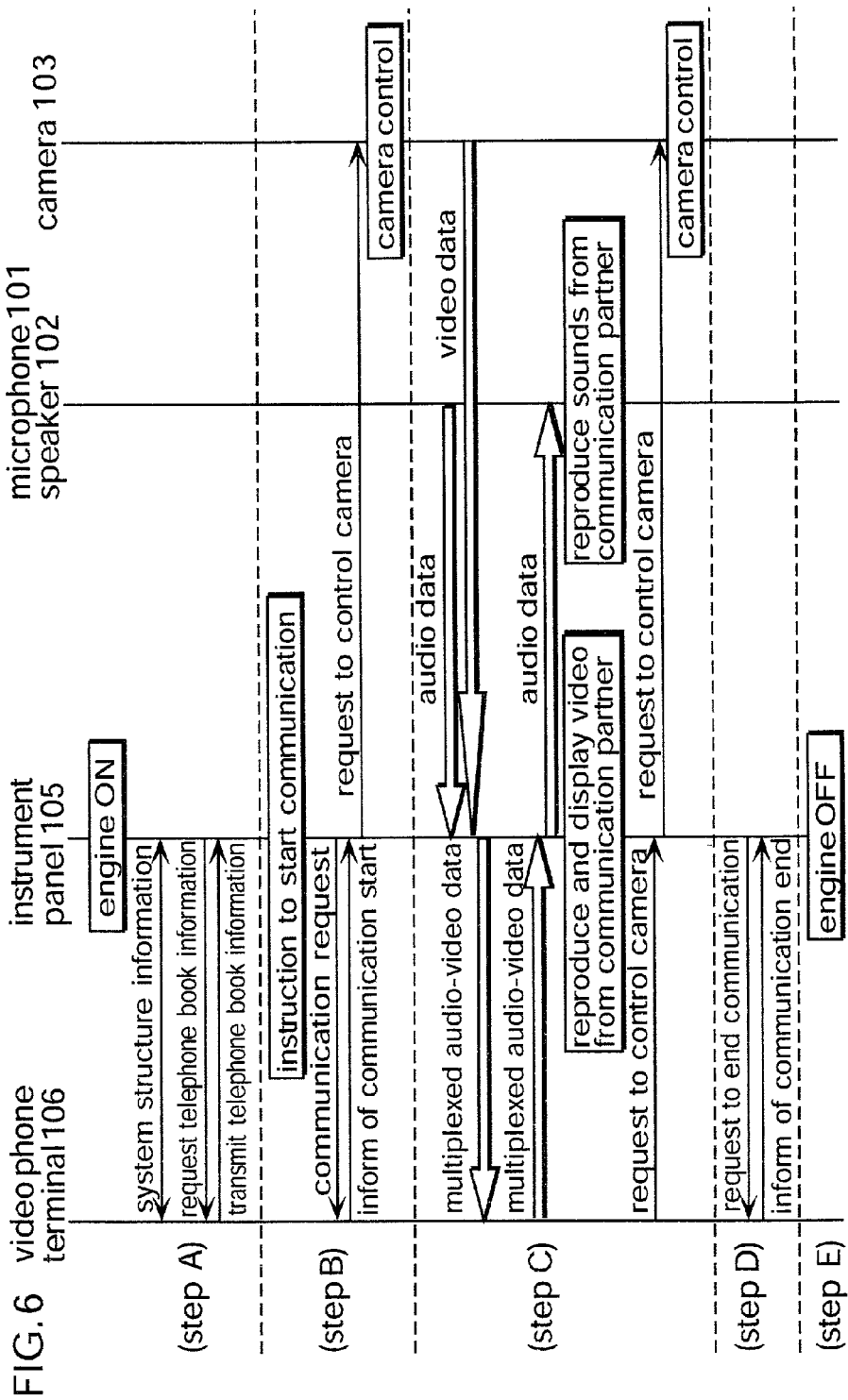

ON-VEHICLE HANDSFREE SYSTEM AND MOBILE TERMINAL THEREOF

BACKGROUND OF THE INVENTION (1) Field of the Invention

The present invention relates to a handsfree system for making a handsfree telephone call in an automobile, and especially relates to an on-vehicle handsfree system that is realized in combination with car devices such as a camera, a microphone a speaker, and a display.

(2) Description of the Prior Art

For the safe use of a mobile phone in an automobile, on-vehicle handsfree systems have become popular.

The conventional on-vehicle handsfree system will be explained with reference to FIG. 1. FIG. 1 schematically shows the structure of a conventional on-vehicle handsfree system.

The conventional handsfree system includes an adapter 1201, a microphone-built-in control switch assembly 1202, a mobile phone 1203, and an external antenna 1204. The adapter 1201 is equipped with connectors to be connected with the microphone-built-in control switch assembly 1202, the mobile phone 1203, and the external antenna 1204 by cables. The external antenna 1204 is positioned outside of the vehicle, for instance, on a rear part of the vehicle. The external antenna 1204 is connected with the adapter 1201 by a cable that is brought into the vehicle.

Here, the operational procedure and the operations of the conventional handsfree system will be explained.

When getting in the vehicle, the driver connects the mobile phone 1203 with the adapter 1201 by a cable. Then, the driver turns on the power of the adapter 1201. When making a telephone call, the driver presses a button on the microphone-built-in control switch assembly 1202 to select the receiver of the call. When the driver presses the up or down button on the microphone-built-in control switch assembly 1202, the adapter 1201 reads the telephone book that has been stored in the mobile phone 1203 in order and guides the driver by sounds from the speaker that is built in the adapter 1201. In this way, the driver confirms and selects the receiver of the call. Then, when the connection button on the microphone-built-in control switch assembly 1202 is pressed, the telephone call is made to the person selected. After that, the telephone call takes place using the microphone that is built in the microphone-built-in control switch assembly 1202 and the speaker in the adapter 1201. When the telephone call is completed, the break button on the microphone-built-in control switch assembly 1202 is pressed.

On the other hand, a telephone call is received only by pressing the connection button on the microphone-built-in control switch assembly 1202. As in the case of finishing a telephone call, a received telephone call is completed by pressing the breaking button.

As has been described before, the driver needs to connect the mobile phone to the adapter by a cable after getting in the vehicle according to the conventional handsfree system. This is troublesome.

Also, the peripheral devices such as the microphone, the speaker, and the control switch assembly that are included in the handsfree system are exclusively used for the handsfree system. This is problematic. More specifically, a vehicle is generally equipped with an audio device and a video device such as a car navigation system, a car audio system, a TV set and a car camera. Although these audio and video devices also include peripheral devices such as a microphone, a speaker, a display, and a remote controller, these peripheral devices cannot be easily used for the handsfree system. Accordingly, the peripheral devices of the handsfree system coexist with the peripheral devices of the audio and video devices in a small internal space of the vehicle. As a result, the limited internal space is inefficiently occupied.

In addition, a video phone compatible mobile terminal (i.e., the video phone terminal) that realizes real time audio and video communication has recently become popular. The video phone terminal may also be used for communication in the vehicle. The video phone terminal, however, has a small display that is not useful to watch the screen. Furthermore, the direction and the position of the video phone terminal needs to be adjusted when the picture of the driver is taken with the built-in camera, for instance. This is also troublesome.

SUMMARY OF THE INVENTION

It is accordingly an object of the present invention to provide a compact on-vehicle handsfree system that does not need peripheral devices exclusively for the handsfree system when peripheral devices of the handsfree system such as the microphone, the speaker, the camera, and the display are included in the car audio and video devices.

Another object of the present invention is to provide an easy-to-operate, on-vehicle handsfree system that requires no camera adjustment and ensures easy operation and safe driving using the control interface that has been designed for use in the in-car environment.

A further object of the present invention is to provide a convenient on-vehicle handsfree system that can be activated without troublesome operations such as to connect the mobile phone with the adapter via a cable and press a button.

The above-mentioned first object may be achieved by an on-vehicle handsfree system that includes a mobile phone terminal and a car device which further includes at least one of a microphone, a speaker, a camera, and a display as car peripheral units, wherein the car device informs the mobile terminal of attribute information, and the mobile terminal replaces at least one of a microphone, a speaker, a camera, and a display that have been built in the mobile terminal with corresponding car peripheral units according to the attribute information to use the car peripheral units.

More specifically, the handsfree video phone system according to the present invention includes a video phone terminal and a car device that further includes a microphone, a speaker, a camera, and an instrument panel with which the microphone, the speaker, and the camera are connected via a cable. The instrument panel is connected with the video phone terminal via a wireless communication medium. When the video phone terminal is brought into the vehicle, the instrument panel informs the video phone terminal of the attribute information on the system structure. According to the attribute information, the video phone terminal switches the paths of multiplexed audio-video data so as to use the microphone, speaker, camera, and instrument panel display that are included in the car device instead of the microphone, speaker, camera, and display that have been built in the video phone terminal when the status changes to the communication status.

The above-mentioned first object may also be achieved by an on-vehicle handsfree system that includes a mobile phone terminal and a car device which further includes at least one of a microphone, a speaker, a camera, and a display as car peripheral units, wherein the car device informs the mobile terminal of attribute information, and the mobile terminal complements at least one of a microphone, a speaker, a camera, and a display that have not been built in the mobile terminal with corresponding car peripheral units according to the attribute information to use the car peripheral units.

As a result, the on-vehicle hansfree system according to the present invention is not equipped with peripheral devices such as a microphone, a speaker, a camera, and a display exclusive for the handsfree system. The car peripheral units such as a microphone, a speaker, a camera, and a display that are included in the car navigation system, the car audio system, the TV set, and the car camera are also used for the handsfree system. More specifically, a mobile terminal such as the video phone terminal that has been brought into the vehicle is connected with the car peripheral units via wireless communication so as to replace the peripheral devices such as a microphone, a speaker, a camera, and a display that have been built in the mobile terminal or to complement the peripheral devices that have not been built in the mobile terminal with the car peripheral units for communication such as a telephone conversation.

Accordingly, a handsfree system is realized only by bringing a mobile terminal into the vehicle without bringing into peripheral devices exclusively for the handsfree system according to the present invention. As a result, the internal space of the vehicle is not wastefully occupied with or disordered by a lot of devices. In addition, the operation of the handsfree system such as volume control can be input using the car peripheral units, so that no special operation exclusively for the handsfree system is required. More specifically, the handsfree video phone can be operated using the control interface that has been designed for use in the in-car environment, so that the handsfree system that ensures easy operation and safe driving is realized without troublesome setting.

The above-mentioned second object may be achieved by an on-vehicle handsfree system in which set information of a car camera is stored in a mobile terminal and the car camera is differently set for each user using the set information at the start of the handsfree status. The second object may also be achieved by an on-vehicle handsfree system in which set information of a car camera related to a mobile terminal is stored in one of a car microphone, a car speaker, a car camera, and a car display, which each are car peripheral units, and the car camera is differently set for each user using the set information stored in the car peripheral unit at the start of the handsfree status. In this way, by storing the set information of the car camera that has been customized for each user in the mobile terminal, for instance, the car camera can be adjusted for the user only by bringing a mobile terminal into the vehicle.

The above-mentioned third object may be achieved by an on-vehicle handsfree system in which the mobile terminal is switched between a stand alone status and a handsfree status according to the operation of the engine key, the input operation of a mobile terminal or a car peripheral unit, the status of communication linkage between a mobile terminal and a car peripheral unit, the status of setting a mobile terminal on the telephone holder, or the like. As a result, the handsfree system can be activated without troublesome operations such as connecting the mobile terminal with the adapter via a cable and pressing a button.

Note that the present invention may be realized as a mobile terminal in the on-vehicle handsfree system that has been described.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 shows the operational sequence of the on-vehicle handsfree video phone system according to the first embodiment of the present invention;

DESCRIPTION OF THE PREFERRED EMBODIMENTS (The First Embodiment)

The following is an explanation of the on-vehicle handsfree video phone system according to the first embodiment of the present invention with reference to figures.

Figure 1:
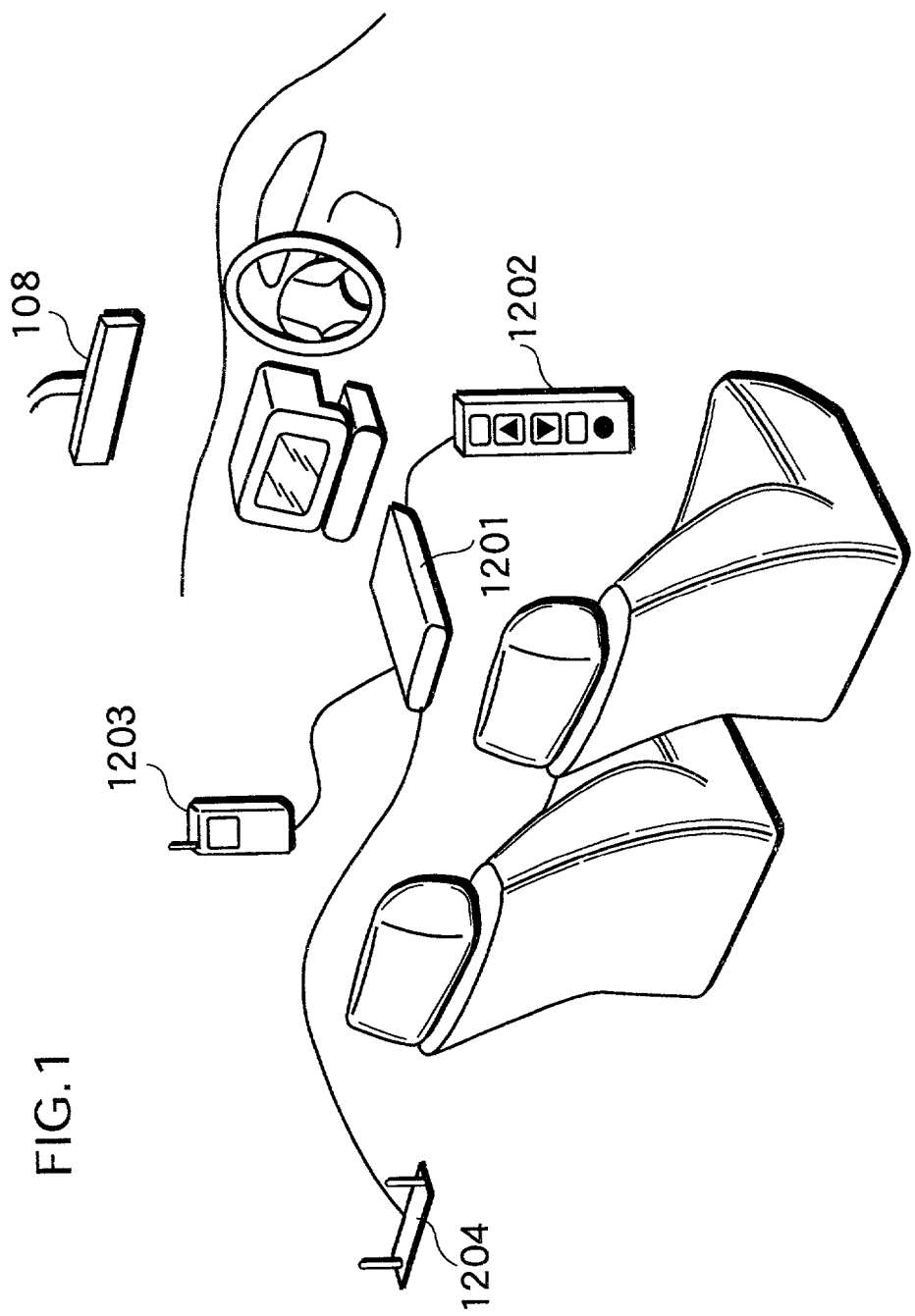
FIG. 1 schematically shows the structure of a conventional on-vehicle handsfree system.
Figure 2:
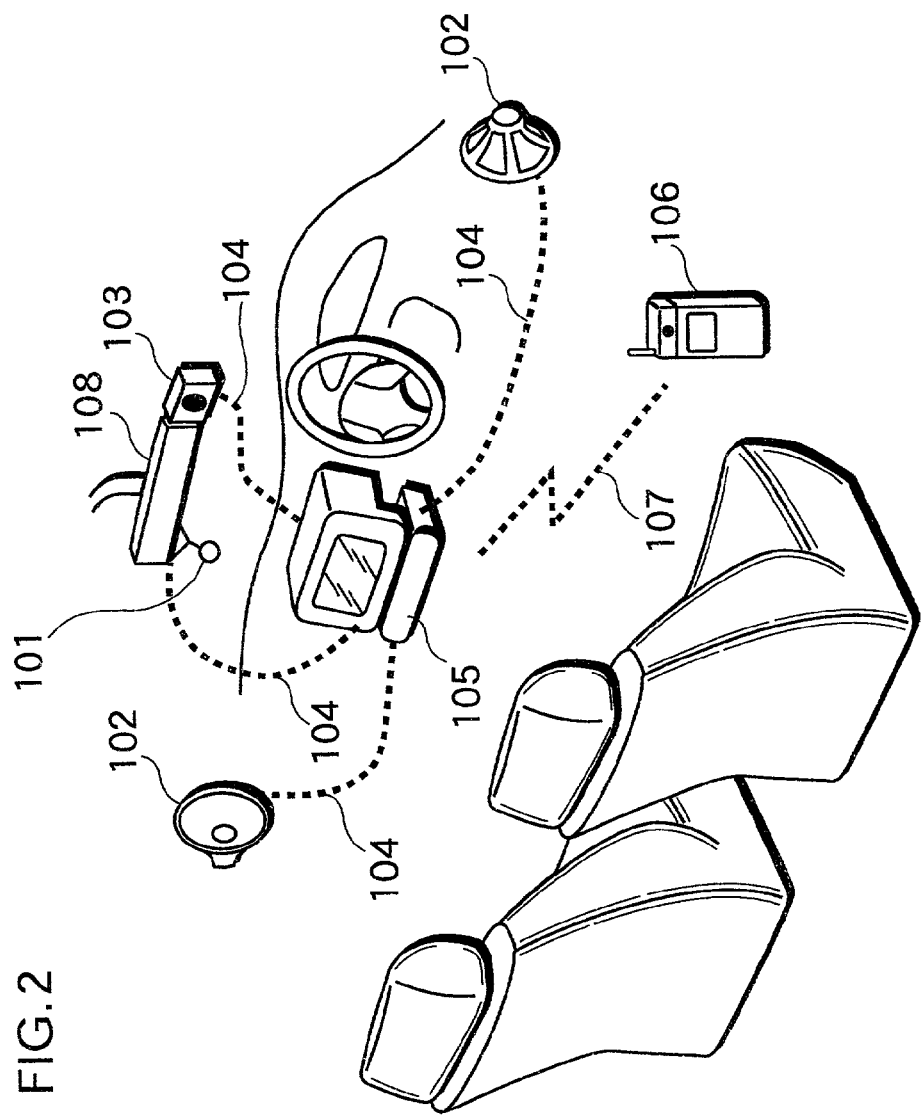
FIG. 2 shows the structure of an on-vehicle handsfree video phone system according to the first embodiment of the present invention.

FIG. 2 shows the structure of the on-vehicle handsfree video phone system according to the first embodiment of the present invention. The handsfree video phone system includes a microphone 101, a speaker 102, a camera 103, a connecting cable 104, an instrument panel 105, a video phone terminal 106, a wireless communication medium 107, and a room mirror 108.

The overall operation of the handsfree video phone system will be explained below.

Car devices such as the microphone 101, the speaker 102, and the camera 103 are connected with the instrument panel 105 via the connecting cable 104. Note that these car devices may be connected via a bus or a wireless medium instead of the connecting cable 104.

The video phone terminal 106 is a mobile wireless communication device that enables audio and video communication (for instance, to have a conversation while watching the video of the conversation partner) between remote places in real time via the telephone network. The video phone terminal 106 is realized by adding the function of video communication to the general mobile phone.

The instrument panel 105 is built in the front panel or a console box. The instrument panel 105 includes a display and a control device such as a touch panel and control buttons. The instrument panel 105 has the function of displaying the operational statuses of car devices such as an air conditioner and a car audio system and also the user interface function for controlling the operational statuses. A car navigation system, a car audio system, and a TV set may be built in the instrument panel 105. In this case, the peripheral devices for sound and video such as the microphone 101, the speaker 102, the camera 103, and the display of the instrument panel 105 are used as the peripheral devices of the car navigation system, the car audio system, the TV set, and the car camera under the control of the instrument panel 105. At the same time, these audio and video peripheral devices are used as the peripheral devices of the handsfree video phone system according to the present embodiment.

Also, the instrument panel 105 is equipped with the wireless communication function such as Bluetooth and IrDA. When the driver brings the video phone terminal 106 into the vehicle, the instrument panel 105 searches for the device that has been brought in via the wireless communication medium 107. Then the instrument panel 105 detects and identifies the video phone terminal 106. The search is triggered by unlocking a door of the vehicle, by setting the key at the accessory status, by turning ON the engine, by operating the instrument panel 105 to start communication, or by setting the video phone terminal 106 on the phone holder. The search may be conducted by the video phone terminal 106. In this case, the search is triggered by operating the video phone terminal 106, or by setting the video phone terminal 106 on the telephone holder, for instance.

After that, the microphone 101 and the speaker 102 that are car devices are used as the device for inputting and outputting sounds, and the camera 103 that is positioned beside the room mirror 108 is used as the device for inputting video. In addition, the instrument panel 105 is used as the device for displaying and inputting telephone conversation operations and video for video phone terminal 106. As a result, handsfree telephone conversations using the car devices and the video phone terminal 106 that has been brought into the vehicle are available. In the handsfree communication status, the microphone, the speaker, the camera, and the like that are included in the video phone terminal 106 are not basically used. Instead, the car devices serve the functions.

On the other hand, when the driver turns the key OFF, locks the door from the outside, inputs a reset operation in the video phone terminal 106 or the instrument panel 105, removes the video phone terminal 106 from the telephone holder, or brings the video phone terminal 106 out of the vehicle to disconnect the video phone terminal 106 from the instrument panel 105, the status of handsfree communication status is cancelled.

Here, the structures of the video phone terminal 106 and the instrument panel 105 are described in detail.

Figure 3:
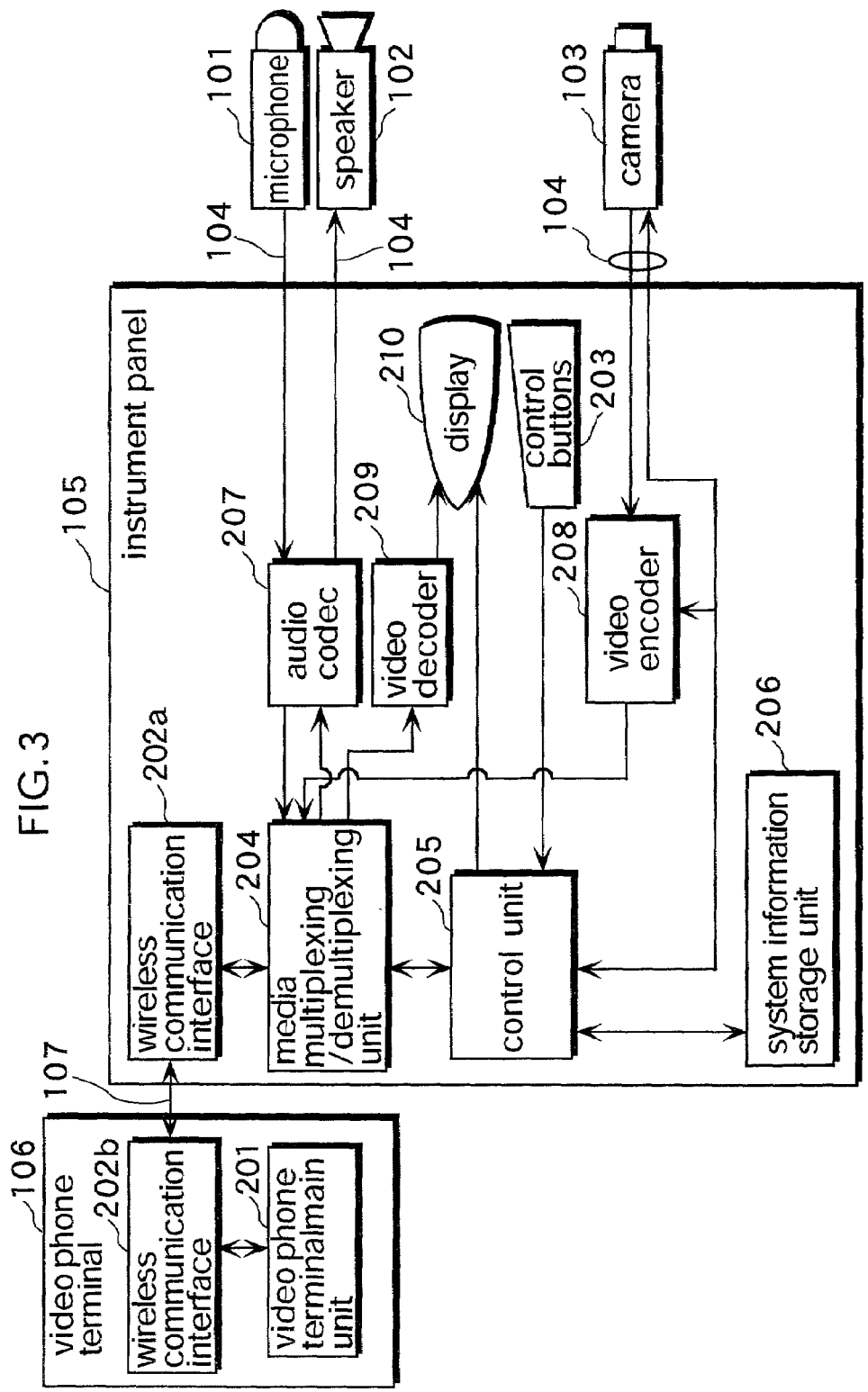
FIG. 3 is a functional block diagram of the on-vehicle handsfree video phone system according to the first embodiment of the present invention.

FIG. 3 is a functional block diagram of the on-vehicle handsfree video phone system according to the first embodiment of the present invention. As shown in FIG. 3, the video phone terminal 106 mainly includes a video phone terminal main unit 201 and a wireless communication interface 202b. The instrument panel 105 includes a wireless communication interface 202a, a media multiplexing/demultiplexing unit 204, a control unit 205, a system information storage unit 206, an audio codec 207, a video encoder 208, a video decoder 209, a display 210, and control buttons 203.

To the instrument panel 105, the microphone 101, the speaker 102, and the camera 103 are connected via the connecting cables 104. The shot direction and zoom amount of the camera 103 are remotely controlled by control signals from the instrument panel 1054.

As in the case of a system information storage unit 315 of the video phone terminal 106, the system information storage unit 206 of the instrument panel 105 stores the information described below. The system information storage unit 206 stores the attribute information of the instrument panel 105 and the information on whether the instrument panel 105 is equipped with a camera, a microphone, and a display, for instance. In addition, the information on the supporting standard is stored. Also, the parameters such as the screen size and the coding system and rate of sounds and video are stored. Furthermore, the set information on the functions is stored. For instance, the camera set information such as the direction and the zoom amount of the camera is stored. Also, the information is stored on which camera is to be selected when a plurality of cameras are connected to the instrument panel 105. More specifically, in the case of the video phone terminal based on 3G-H324M corresponding to the next generation mobile phone system IMT-2000, information described below is stored as the system information. The audio coding system is AMR, a variable bit rate, the video coding system is MPEG4 simple profile (the screen size is QCIF and the rate is 10 frames per second), the media multiplex is H.223 of ITU-T, the control system is H.245 of ITU-T, the camera control is based on H.281 of ITU-T, and the rate of sounds and video in total is no faster than 64 kpbs.

Figure 4:
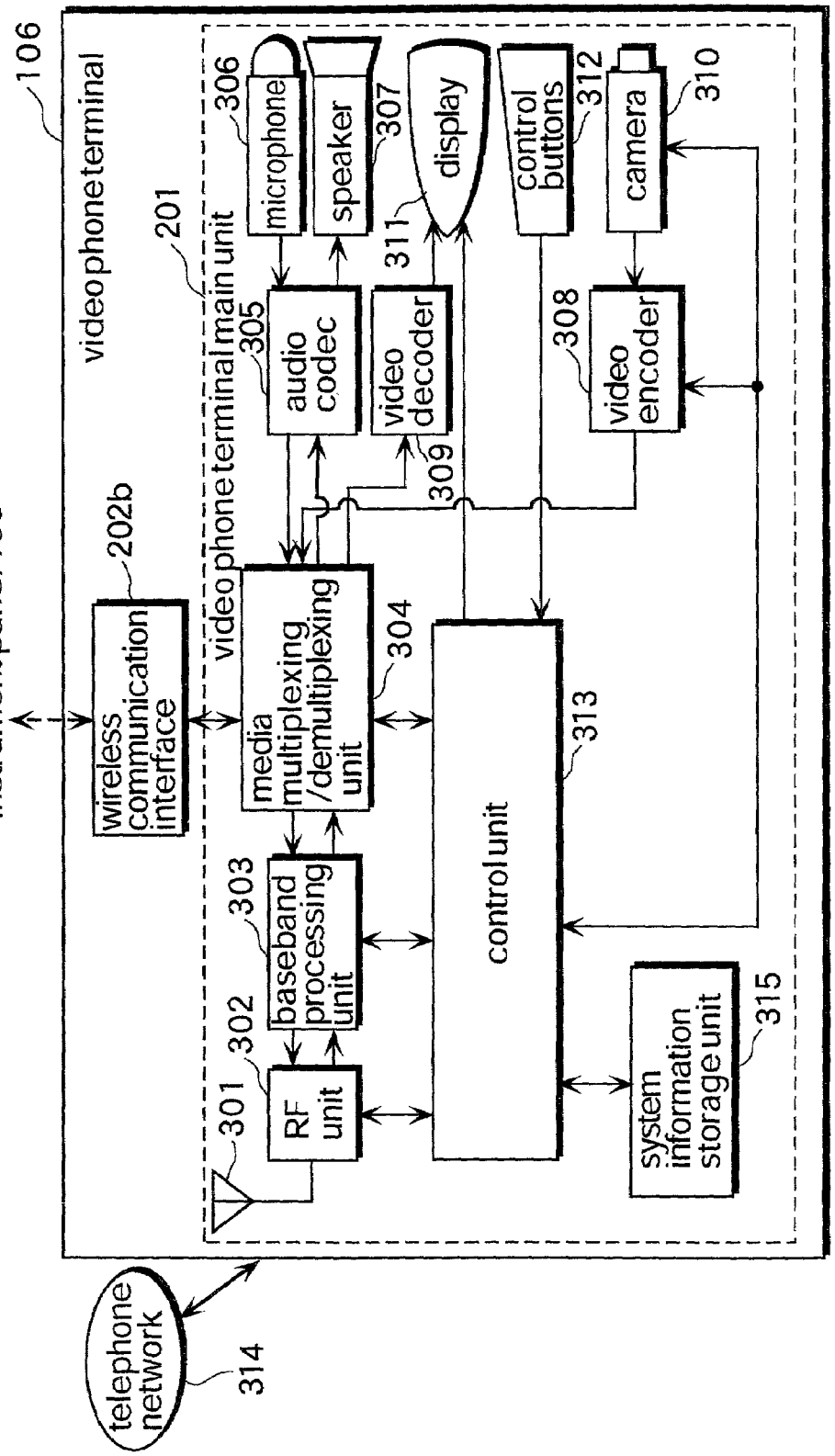
FIG. 4 is a functional block diagram of a video phone terminal according to the first embodiment of the present invention.

FIG. 4 is a functional block diagram showing the structure of the video phone terminal 106 in FIG. 3 in detail. The video phone terminal 106 includes the video phone terminal main unit 201 and the wireless communication interface 202b. The video phone terminal main unit 201 includes an antenna 301, an RF unit 302, and a baseband processing unit 303 for serving the functions of the ordinary mobile phone. The RF unit 302 sends and receives RF signals. The baseband processing unit 303 performs modem processing and error control. Also, the video phone terminal main unit 201 includes a media multiplexing/demultiplexing unit 304 for multiplexing and demultiplexing of audio, video, and control data. In addition, an audio codec 305, a microphone 306, and a speaker 307 are included in the video phone terminal main unit 201 as an audio processing system. As a video processing system, a video encoder 308, a video decoder 309, a camera 310, a display 311, and control buttons 312 are included. The audio codec 305 encodes and decodes sounds. The video encoder 308 encodes video. The video decoder 309 decodes video.

At least one of the audio codec 305 (the encoding side) and the video encoder 308 receives an instruction from the media demultiplxing unit 304 (the multiplexing side) to control the coding rate. A control unit 313 controls each of these functions and negotiates with the switchboard and the receiver of the communication via a telephone network 314 to realize the video phone communication. In this case, the camera 310 is also controlled by an instruction from the communication partner via the control unit 313. More specifically, the zoom and direction of the camera 310 are adjusted. A system information storage unit 315 stores the information on the standard to which the video phone terminal 106 corresponds and the information on the functions of the video phone terminal 106 as the system information of the video phone terminal 106. More specifically, the attribute information of the video phone terminal 106 is stored such as the manufacturer, the type, the model number, and the corresponding standard. In addition, audio information is stored on whether the video phone terminal 106 is equipped with a microphone and a speaker, and on the corresponding audio coding system and rate. Furthermore, video information is stored on whether the video phone terminal 106 is equipped with a display camera, on the parameters of the corresponding display size and video coding system and rate, and on the command system that is supported for the camera control. Also, control information on the media multiplexing/demultiplexing system, on the call control system, and on the supported protocol. Accordingly, the microphone 306, the speaker 307, the display 311, the audio codec 305, the camera 310, the video encoder 308, the video decoder 309, and the media multiplexing/demultiplexing unit 304 of the video phone terminal 106 may be bypassed (not used) when the corresponding functions of the instrument panel 105 can be used.

Figure 5:
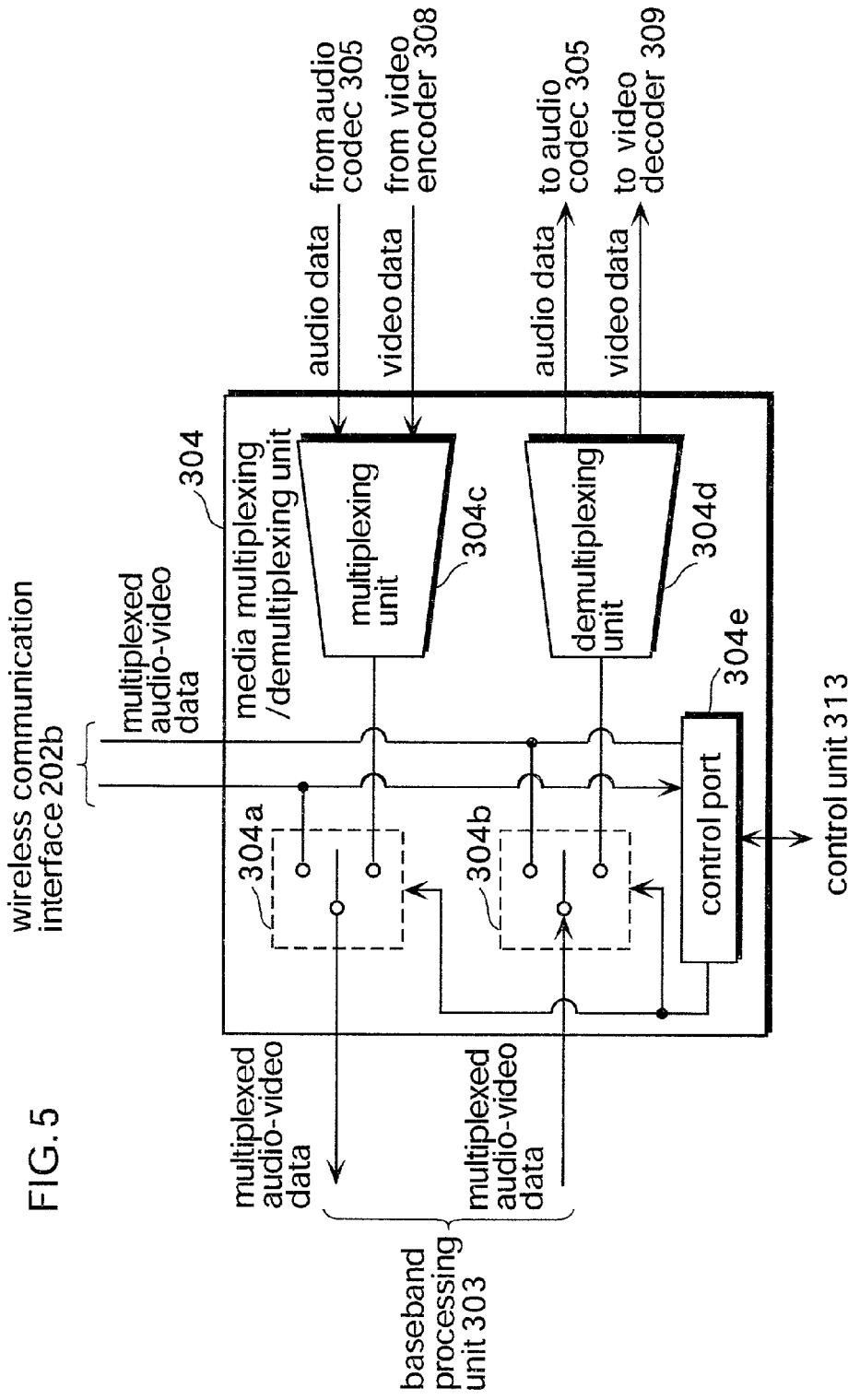
FIG. 5 is a block diagram that shows in detail the structure of a media multiplexing/demultiplexing unit of the video phone terminal according to the first embodiment of the present invention.

FIG. 5 is a block diagram that shows in detail the structure of the media multiplexing/demultiplexing unit 304 of the video phone terminal 106 in FIG. 4. The media multiplexing/demultiplexing unit 304 multiplexes and demultiplexes audio, video, and control data and also switches the paths of the data. The media multiplexing/demultiplexing unit 304 includes a first switching unit 304a, a second switching unit 304b, a multiplexing unit 304c, a demultiplexing unit 304d, and a control port 304e.

The multiplexing unit 304c is a multiplexer circuit. The multiplexing unit 304 multiplexes the audio data from the audio codec 305 with the video data from the video encoder 308, and outputs the multiplexed data to the first switching unit 304a. The first switching unit 304a is a two-input one-output selector circuit, for instance. The first switching unit 304a selects one of multiplexed audio-video data from the wireless communication interface 202b and multiplexed audio-video data from the multiplexing unit 304c according to the control signal from the control port 304e, and outputs the selected data to the baseband processing unit 303.

The second switching unit 304b is a one-input two-output selector circuit, for instance. The second switching unit 304b outputs the multiplexed audio-video data from the baseband processing unit 303 to one of the wireless communication interface 202b and the demultiplexing unit 304b. The demultiplexing unit 304d is a demultiplexing circuit, for instance. The demultiplexing unit 304d demultiplexes the multiplexed audio-video data from the second switching unit 304b into audio data and video data, and outputs the audio data to the audio codec 305 and the video data to the video decoder 309.

The control port 304e is a gating circuit, for instance, for extracting and transferring control data. The control port 304e transfers control data between the wireless communication interface 202b and the control unit 313, and controls the first and second switching units 304a and 304b according to control data from the control unit 313.

According to the connecting status at the first and second switching units 304a and 304b of the media multiplexing/demultiplexing unit 304, it is determined whether a group of the microphone 306, the speaker 307, the display 311, and the camera 310 of the video phone terminal 106 or a group of the microphone 101, the speaker 102, the display 210, and the camera 103, which are car devices, is used as the devices for inputting and outputting sounds and video.

Here, an explanation of the operational sequence of the present embodiment will be given.

FIG. 6 shows the operational sequence of the on-vehicle handsfree video phone system according to the first embodiment of the present invention. With reference to FIG. 6, an explanation of the operational sequence will be given below.

(Step A)

When the driver gets in the vehicle and sets the vehicle at the accessory status, the instrument panel 105 searches for the peripheral devices that are available for communication via the wireless interface 202a, and detects and identifies the video phone terminal 106. In this case, the control units 313 and 205 of the video phone terminal 106 and the instrument panel 105 exchange the information that has been stored in the system information storage units 315 and 206 via the wireless communication interfaces 202a and 202b. By doing so, the control units 313 and 205 negotiate for using the functions of the instrument panel 105 instead of the functions of the video phone terminal 106. At the same time, the data in the telephone book that has been stored in the video phone terminal 106 is transmitted to the instrument panel 105 via the wireless communication interfaces 202a and 202b.

Figure 7A:
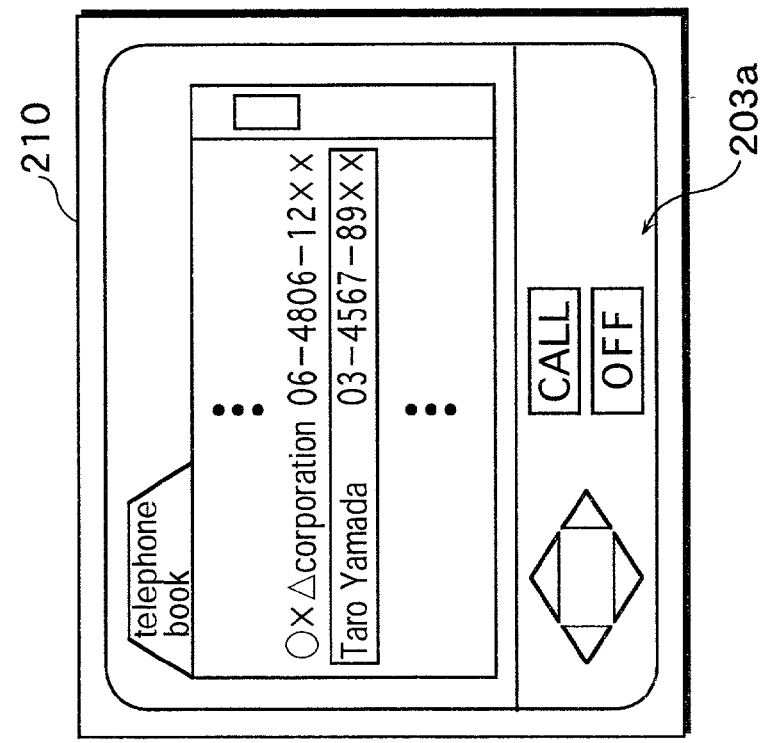
FIG. 7A is a display example of a telephone book on the screen of an instrument panel according to the first embodiment of the present invention.

FIG. 7A is a display example on the display 210 of the instrument panel 105. In FIG. 7A, a telephone book according to the telephone book data that has been transmitted from the video phone terminal 106 is displayed around the center of the screen. The control buttons 203a are displayed in the lower part of the screen.

(Step B)

Then, when the driver operates control buttons 203 on the instrument panel 105 (or control buttons on the screen) to select the communication partner and starts the communication, the video phone terminal 106 is informed of the operation via the wireless communication interface 202a. The video phone terminal 106 calls out and completes the connection with the communication partner via the telephone network 314. At the same time, the direction and the zoom of the camera 103 are adjusted for the video phone terminal 106 according to the set information in the system information that has been stored in the system information storage unit 206 of the instrument panel 105.

Note that different kinds of camera set information (shot conditions such as the shot direction and the zoom) corresponding to each of a plurality of video phone terminals have been stored in the system information storage unit 206 of the instrument panel 105. Accordingly, when the video phone terminal 106 is brought into the vehicle, the camera set information corresponding to the video phone terminal 106 that has been detected by the instrument panel 105 is read from the system information storage unit 206 and transmitted to the camera 103. According to the camera set information, the direction of the lens and the zoom are adjusted.

Note that the same effect can be obtained by signal processing instead of moving the direction of the camera 103, for instance, by cutting out the part of the driver from the video showing the inside of the vehicle. Also, when a plurality of cameras are connected, the camera at the driver's seat can be selected according to the set information in the system information. Note that the set information can be updated by adjusting the camera 103 using control buttons 203, for instance, and overwriting the newly set status over the system information.

(Step C)

Then, the audio and video data that have been input from the microphone 101 and the camera 103 that are connected with the instrument panel 105 are encoded according to the rate adjustment request from the video phone terminal 106 and multiplexed. After that, the audio and video data is sent to the communication partner via the telephone network 314. More specifically, the first switching unit 304a of the media multiplexing/demultiplexing unit 304 of the video phone terminal 106 in FIG. 5 connects the baseband processing unit 303 with the wireless communication interface 202b according to the instructions from the control unit 313. By doing so, the first switching unit 304a has the multiplexed audio-video data pass through the first switching unit 304a to be output to the baseband processing unit 303.

On the other hand, the audio and video data that have been sent from the communication partner is transmitted to the instrument panel 105 via the wireless communication interfaces 202a and 202b. Then, the audio and video data is decoded to be reproduced and displayed using the speaker 102 and the display 210. More specifically, the second switching unit 304b of the media multiplexing/demultiplexing unit 304 of the video phone terminal 106 in FIG. 5 connects the baseband processing unit 303 with the wireless communication interface 202b according to the instructions from the control unit 313. By doing so, the second switching unit 304b outputs the multiplexed audio and video data that has been transferred from the baseband processing unit 303 to the wireless communication interfaces 202a and 202b.

Note that the video that has been taken by the camera 103 can be transferred to and displayed by the display 210 in order to acknowledge the same video that is to be sent to the communication partner. Also, the direction and the zoom of the camera 103 can be controlled according to the camera control request from the communication partner.

Figure 7B:
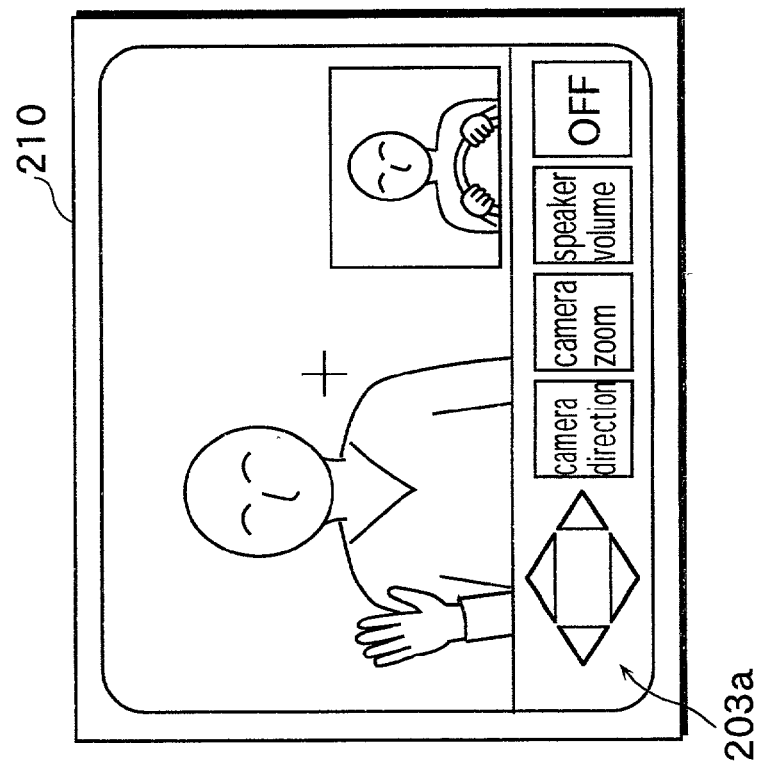
FIG. 7B is a display example of the driver and the communication partner on the screen of the instrument panel according to the first embodiment of the present invention.

FIG. 7B is a display example on the display 210 of the instrument panel 105. The upper half of the body of the communication partner is displayed around the center of the screen, the upper half of the body of the driver who is sending data to the communication partner around the lower right corer, and the control buttons 203a at the lower part.

(Step D)

Control buttons 203 on the instrument panel 105 (or he control buttons on the screen) are operated when the communication is completed. Then, a call disconnect signal is sent to the switchboard via the video phone terminal 106 and the telephone network 314 to disconnect the communication.

On the other hand, when an incoming call is received, the instrument panel 105 is called via the telephone network 314, the video phone terminal 106, and the wireless communication interfaces 202a and 202b to be informed of the incoming call. The instrument panel 105 displays the information on the sender of the incoming call. Then, the communication becomes available by the same operations as in the case of sending an outgoing call. The same can be said when the communication is disconnected by the incoming call sender.

(Step E)

The communication between the video phone terminal 106 and the instrument panel 105 becomes unavailable when the driver turns the key OFF or brings the video phone terminal 106 out of the vehicle, for instance. In this case, the handsfree status is cancelled, and the video phone terminal 106 and the instrument panel 105 returns to the original status.

As has been described a handsfree video phone system using the in-car environment (the car devices) that has been designed for easy and safe operation is realized just by bringing the video phone terminal 106 into the vehicle without selecting and adjusting the camera 103 according to the present embodiment.

In the present embodiment, the explanation has been given on the assumption that the camera set information is included in the system information that is stored in the system information storage unit 206 of the instrument panel 105. Note that the set information of devices such as the camera 103, the microphone 101, and the display 210 may be stored as the system information in the system information storage unit 315 of the video phone terminal 106, transmitted to the instrument panel 105, and used for setting the devices.

Also, the explanation has been given on the assumption that the instrument panel 105 includes the video encoder 208, the video decoder 209, the audio codec 207, and the media multiplexing/demultiplexing unit 204 and the functions of these devices are used in the present embodiment. Instead, the instrument panel 105 may include only the camera 103, the microphone 101, the display 210, and the control buttons 203, and functions of the video phone terminal 106 may replace the functions of the video encoder 208, the video decoder 209, the audio codec 207, and the media multiplexing/demultiplexing unit 204.

(The Second Embodiment)

Here, an explanation of the on-vehicle handsfree video phone system according to the second embodiment of the present invention will be given with reference to figures.

Figure 8:
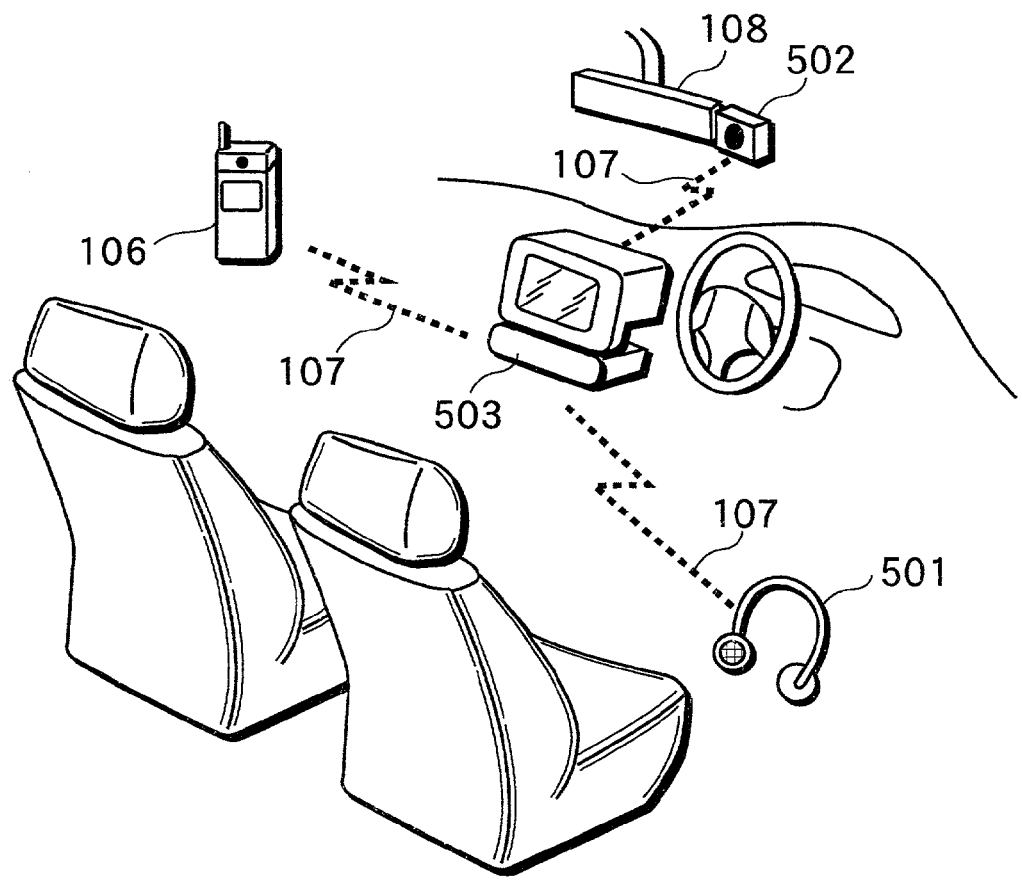
FIG. 8 shows the structure of an on-vehicle handsfree video phone system according to the second embodiment of the present invention.

FIG. 8 shows the structure of the on-vehicle handsfree video phone system according to the second embodiment of the present invention. The handsfree video phone system includes a headset 501, a wireless camera 502, an instrument panel 503, a video phone terminal 106, a wireless communication medium 107, and a room mirror 108. In the second embodiment (including figures), the same reference numbers are given to the same components as in the first embodiment. Also, the explanation will focus on only different components.

Here, an overall explanation of the operations of the handsfree video phone system will be given.

Unlike the first embodiment, the wireless headset 501 is used instead of a microphone and a speaker. In terms of the camera, the wireless camera 50 is used. The headset 501 and the wireless camera 502 that belong to the vehicle are connected with the instrument panel 503 via the wireless communication medium 107. Also, the instrument panel 105 and the video phone terminal 106 are connected with each other via the same wireless communication medium 107 to enable the communication between the instrument panel 105 and the video phone terminal 106.

When the driver brings the video phone terminal 106 into the vehicle, the instrument panel 503 searches for the device that has been brought in via the wireless communication medium. Then the video phone terminal 106 is detected and identified. When not having been identified, the headset 501 and the wireless camera 502 are identified at the same time. Note that the trigger of the search is the same as in the first embodiment. For instance, the search is triggered by setting the key at the accessory status. Of course, the video phone terminal 106 may conduct the search. In this case, the search is triggered by operating the video phone terminal 106, or by setting the video phone terminal 106 on the telephone holder, for instance.

Then, the headset 501 that belongs to the vehicle is used for inputting and outputting sounds, the wireless camera 502 that is positioned beside the room mirror 108, for instance, is used for inputting video, and the instrument panel 503 is used for displaying and inputting operations and video for the video phone terminal 106 as in the first embodiment. Accordingly, the handsfree communication using the video phone terminal 106 that has been brought in the vehicle is realized. In this handsfree communication status, the microphone, the speaker, the camera, and the like of the video phone terminal 106 are not used basically. Instead, the devices that belong to the vehicle provide the functions.

On the other hand, the handsfree communication status is cancelled with the same conditions as in the first embodiment, for instance, by turning OFF the key.

Here, a detailed explanation of the structure of the video phone terminal 106, the instrument panel 503, the wireless camera 502, and the headset 501 will be given.

Figure 9:
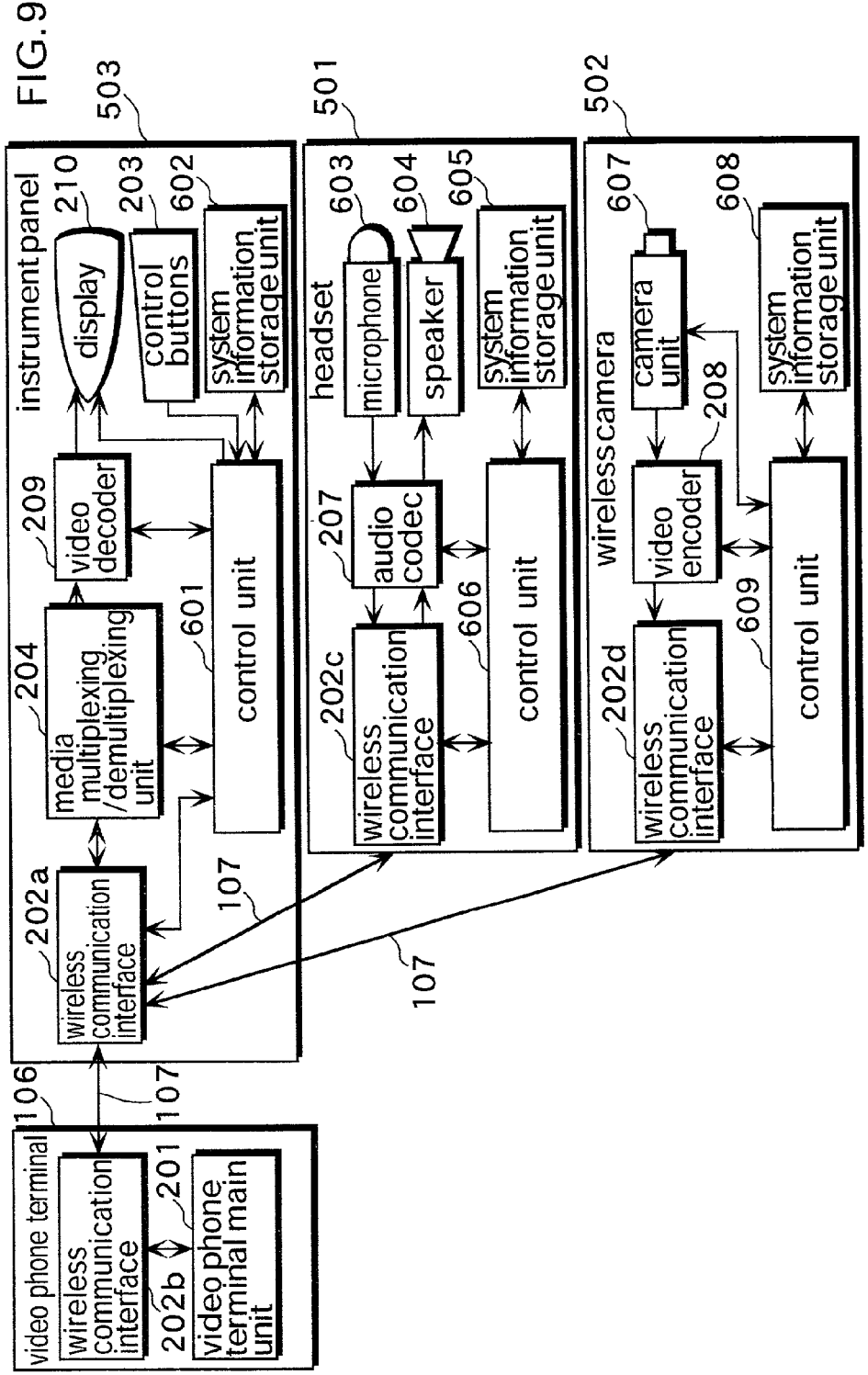
FIG. 9 is a functional block diagram of the on-vehicle handsfree video phone system according to the second embodiment of the present invention.

FIG. 9 is a functional block diagram of the on-vehicle handsfree video phone system according to the second embodiment of the present invention. The video phone terminal 106 has the same block structure as in the first embodiment. The instrument panel 503 includes a wireless communication interface 202*a*, a media multiplexing/demultiplexing unit 204, a control unit 205, a system information storage unit 602, a display 210, and a control buttons 203. The headset 501 and the wireless camera 502 are connected with the instrument panel 503 via the wireless communication medium 107.

The system information storage unit 602 of the instrument panel 503 stores the information described below. The system information storage unit 602 stores the information on the functions, for instance, the information on whether the instrument panel 503 includes a display, as the attribute information of the instrument panel 503. Also, the system information storage unit 602 stores the system information on the video phone terminal 106, the wireless camera 502, and the headset 501 that has been obtained from the video phone terminal 106, the wireless camera 502, and the headset 501 via the wireless communication medium 107. Furthermore, the set information on the peripheral devices is stored. For instance, the camera set information such as the direction and the zoom amount of the wireless camera 502, and the information on which camera is to be selected when a plurality of cameras are connected to the instrument panel 503. Of course, the set information of the wireless camera 502 may be stored in the wireless camera 502.

The wireless camera 502 includes a video encoder 208, a system information storage unit 608, a control unit 609, and a wireless communication interface 202*d*, apart from a camera unit 607. Camera video data that has been encoded in the video encoder 208 is transmitted to the instrument panel 503 via the wireless communication medium 107. The system information storage unit 608 stores the parameters of the screen size and the video coding system and rate, and the supporting standard as the attribute information of the wireless camera 502.

The headset 501 includes a microphone 603, an earphone-type speaker 604, an audio codec 207, a system information storage unit 605, a control unit 606, and a wireless communication interface 202*c*. The system information storage unit 605 stores the parameters of the audio coding system and rate and the information on the supporting standard as the attribute information of the headset 501.

Figure 10:
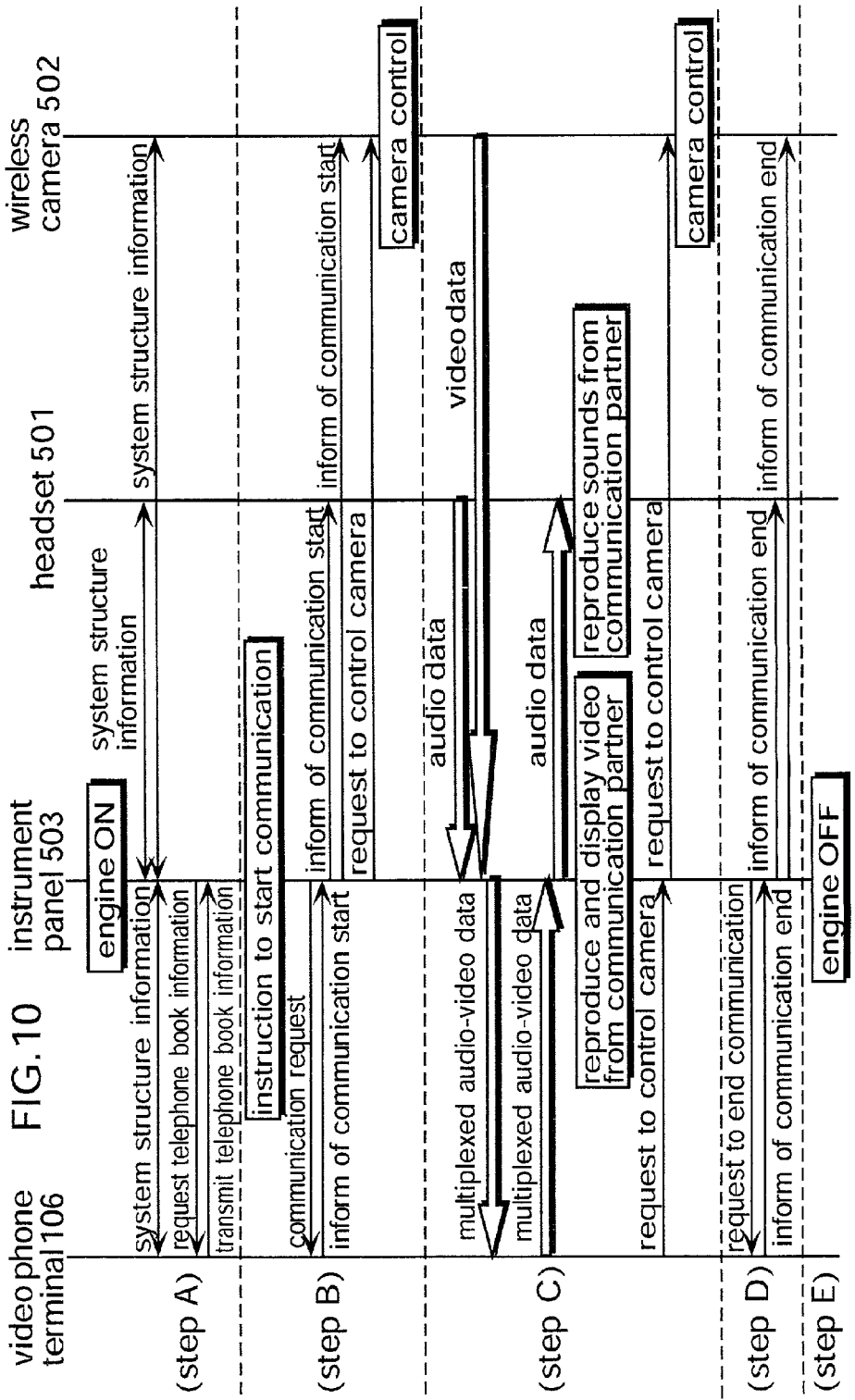
FIG. 10 shows the operational sequence of the on-vehicle handsfree video phone system according to the second embodiment of the present invention.

FIG. 10 shows the operational sequence of the on-vehicle handsfree video phone system according to the second embodiment of the present invention. An explanation of the operational sequence will be given below.

(Step A)

When the driver gets in the vehicle and sets the vehicle at the accessory status, the instrument panel 503 searches for the peripheral devices that are available for communication via the wireless interface 202*a*, and detects and identifies the video phone terminal 106, the wireless camera 502, and the headset 501. In this case, the control units 313, 609, 606, and 601 of the video phone terminal 106, the wireless camera 502, the headset 501, and the instrument panel 503 exchange the information that has been stored in the system information storage units 315, 608, 605, and 602 via the wireless communication interfaces 202*a* to 202*d*. By doing so, the control units 313, 609, 606, and 601 negotiate for using the functions of wireless camera 502, the headset 501, and the instrument panel 503 instead of the functions of the video phone terminal 106 to realize a hands free video phone. At the same time, the data in the telephone book that has been stored in the video phone terminal 106 is transmitted to the instrument panel 503 via the wireless communication interfaces 202*a* and 202*b*.

(Step B)

Then, when the driver operates control buttons 203 on the instrument panel 503 to select the communication partner and starts the communication, the video phone terminal 106 is informed of the operation via the wireless communication interfaces 202*a* and 202*b*. The video phone terminal 106 calls out and completes the connection with the communication partner via the telephone network 314. At the same time, the direction and the zoom of the camera 502 are adjusted for the video phone terminal 106 according to the set information in the system information that has been stored in the system information storage unit 602 of the instrument panel 503. The same effect can be obtained by signal processing, for instance, by cutting out the part of the driver from the video showing the inside of the vehicle instead of moving the direction of the camera 502. Also, when a plurality of cameras are connected, the camera at the driver's seat can be selected according to the set information in the system information. Note that the set information can be updated by adjusting the wireless camera 502 using control buttons 203, for instance, and overwriting the newly set status over the system information.

(Step C)

Then, the audio and video data that have been input from the headset 501 and the wireless camera 502 are encoded according to the rate adjustment request from the video phone terminal 106 and multiplexed in the instrument panel 503. After that, the audio and video data is transmitted to the video phone terminal 106 via the wireless communication interfaces 202a and 202b and then sent to the communication partner via the telephone network 314. On the other hand, the audio and video data that have been sent from the communication partner is transmitted to the instrument panel 503 via the wireless communication interfaces 202a and 202b. Then, after the media demultiplex of the audio and video data, the audio data is transmitted to the headset 501 via the wireless communication medium 107 and the sounds are reproduced. On the other hand, the video is displayed by the display 210. Of course, it is possible to display the video that has been taken by the wireless camera 502 by the display 210 and acknowledge the same video that is to be sent to the communication partner. Also, the direction and the zoom of the wireless camera 502 can be controlled according to the camera control request from the communication partner.

(Step D)

Control buttons 203 on the instrument panel 503 are operated when the communication is completed. Then, a call disconnect signal is sent to the switchboard via the video phone terminal 106 and the telephone network 314 to disconnect the communication.

On the other hand, when an incoming call is received, the instrument panel 503 is called via the telephone network 314, the video phone terminal 106, and the wireless communication interfaces 202a and 202b to be informed of the incoming call. The instrument panel 503 displays the information on the sender of the incoming call. Then, the communication becomes available by the same operations as in the case of sending an outgoing call. The same can be said when the communication is disconnected by the incoming call sender.

(Step E)

The communication between the video phone terminal 106 and the instrument panel 503 becomes unavailable when the driver turns the key OFF or brings the video phone terminal 106 out of the vehicle, for instance. In this case, the handsfree status is cancelled, and the video phone terminal 106 and the instrument panel 503 returns to the original status.

As has been described, a handsfree video phone system using the in-car environment (the devices that belong to the vehicle) that has been designed for easy and safe operation is realized just by bringing the video phone terminal 106 into the vehicle without selecting and adjusting the wireless camera 502 according to the present embodiment.

In the present embodiment, the explanation has been given on the assumption that the camera set information is included in the system information that is stored in the system information storage unit 602 of the instrument panel 503. Note that the set information of the wireless camera 502 may be stored in the system information storage unit 608 of the wireless camera 502. Also, the set information of devices such as the wireless camera 502, the microphone 603, and the display 210 may be stored as the system information in the system information storage unit 315 of the video phone terminal 106, transmitted to the instrument panel 503, and used for setting the devices.

Also, the explanation has been given on the assumption that the wireless camera 502, the headset 501, and the instrument panel 503 includes the video encoder 208, the camera unit 607, the video decoder 209, the display 210, the audio codec 207, the microphone 603, the speaker 604, and the media multiplexing/demultiplexing unit 204 and the functions of these devices are used in the present embodiment. Instead, the functions of these devices may be replaced by functions of the video phone terminal 106.

(The Third Embodiment)

Here, an explanation of the on-vehicle handsfree video phone system according to the third embodiment of the present invention with reference to figures.

Figure 11:
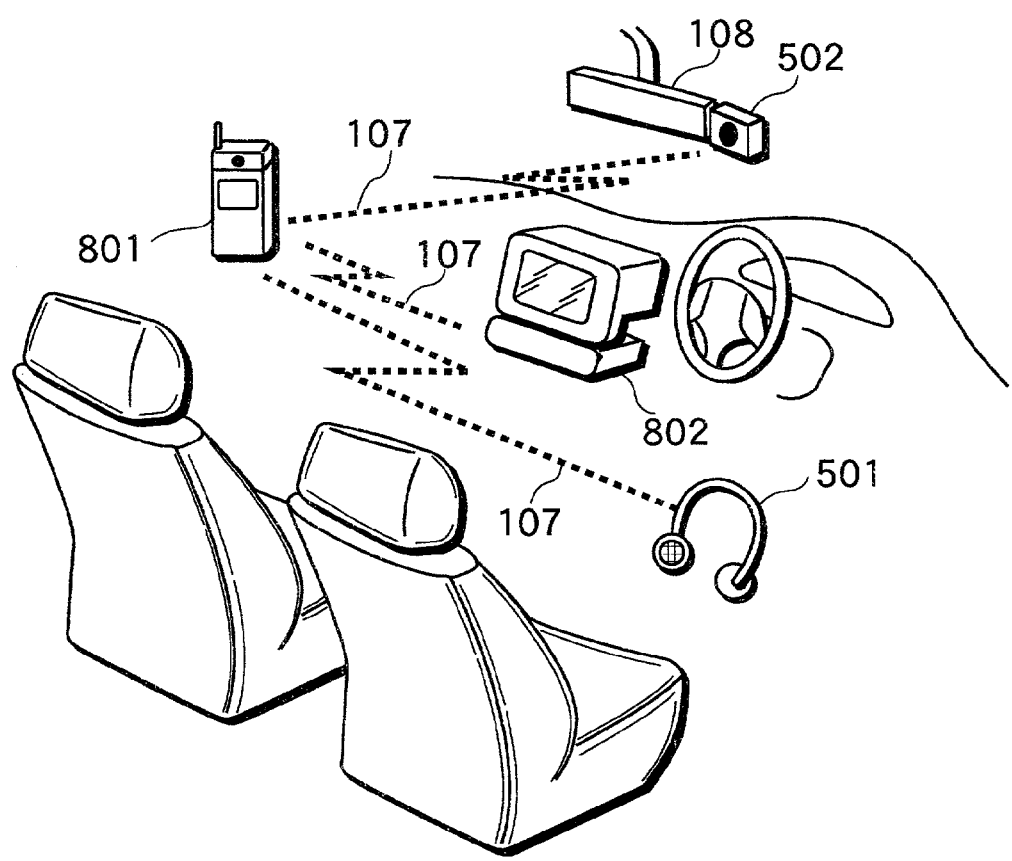
FIG. 11 shows the structure of an on-vehicle handsfree video phone system according to the third embodiment of the present invention.

FIG. 11 shows the structure of the on-vehicle handsfree video phone system according to the third embodiment of the present invention. The handsfree video phone system includes a video phone terminal 801, an instrument panel 802, a headset 501, a wireless camera 502, a wireless communication medium 107, and a room mirror 108.

An overall explanation of the handsfree video phone system will be given below.

Unlike in the second embodiment, the video phone terminal 801 that is brought into the vehicle is directly connected with the headset 501, the wireless camera 502, and the instrument panel 802, which belong to the vehicle, via the wireless communication medium 107 in the present embodiment. As a result, the media demultiplex is performed in the video phone terminal 801. Accordingly, the instrument panel 802 does not need to have the demultiplexing function.

When the driver brings the video phone terminal 801 into the vehicle, peripheral devices are searched for via the wireless communication medium 107 and the instrument panel 802, the wireless camera 502, and the headset 501 are detected and identified. The search is triggered by the same operations as in the first embodiment, for instance, by pressing a control button 312 of the video phone terminal 801.

Then, the headset 501 that belongs to the vehicle is used as the device for inputting and outputting sounds, the wireless camera 502 that is positioned besides the room mirror 108, for instance, as the device for inputting video, and the instrument panel 802 as the device for displaying and inputting telephone conversation operations and video for video phone terminal 801 as in the case of the second embodiment. As a result, the handsfree communication can be available using the devices that belong to vehicle and the video phone terminal 801 that has been brought into the vehicle. In this handsfree communication, the microphone, the speaker, and the camera of the video phone terminal 801 are not basically used. Instead, the devices that belong to the vehicle are used.

On the other hand, the handsfree communication status is cancelled with the same conditions as in the first embodiment. For instance, the handsfree communication status is cancelled by the cancellation operation of the video phone terminal 801, by turning OFF the key, or by bringing the video phone terminal 801 out of the vehicle.

Here, a detailed explanation of the structure of the video phone terminal 801, the instrument panel 802, the wireless camera 502, and the headset 501 will be given.

Figure 12:
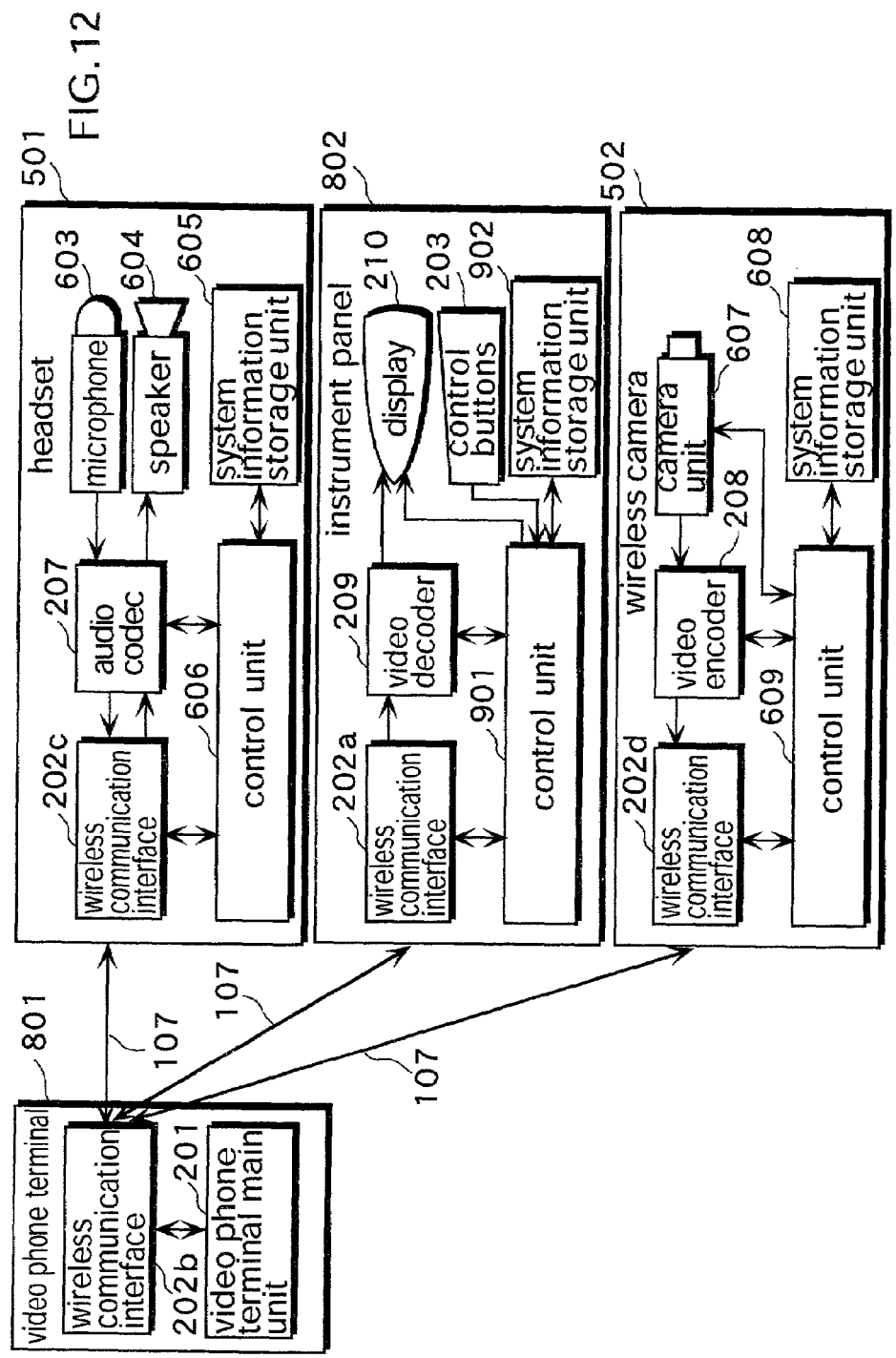
FIG. 12 is a functional block diagram of the on-vehicle handsfree video phone system according to the third embodiment of the present invention.

FIG. 12 is a functional block diagram of the on-vehicle handsfree video phone system according to the third embodiment of the present invention.

The wireless camera 502 and the headset 501 have the same block structures as in the second embodiment. The instrument panel 802 includes a wireless communication interface 202a, a video decoder 209, a display 210, control buttons 203, a system information storage unit 902, and a control unit 901. The instrument panel 802 basically has the same structure as the instrument panel 503 of the second embodiment. No media multiplexing/demultiplexing unit is included in the instrument panel 802, however. In addition, the instrument panel 802 does not communicate with the wireless camera 502 and the headset 501 directly. In this respect, the operation by the control unit 901 is different from that in the instrument panel 503 of the second embodiment. The system information storage unit 902 stores the attribute information of the instrument panel 802, for instance, the information on whether the instrument panel 802 is equipped with a display.

The video phone terminal 801 has the same block structure as in the first and second embodiments. The system information storage unit 315, however, stores the system information of the instrument panel 802, the wireless camera 502, and the headset 501, which has been obtained from the instrument panel 802, the wireless camera 502, and the headset 501 via the wireless communication medium, apart from the system information that has been described in the first embodiment. In addition, the set information of the peripheral devices is stored, for instance, the camera set information such as the direction and the zoom amount of the camera and the information on which camera is to be selected when a plurality of cameras are connected to the instrument panel 802. Of course, the camera set information may be stored in the wireless camera 502.

Figure 13:
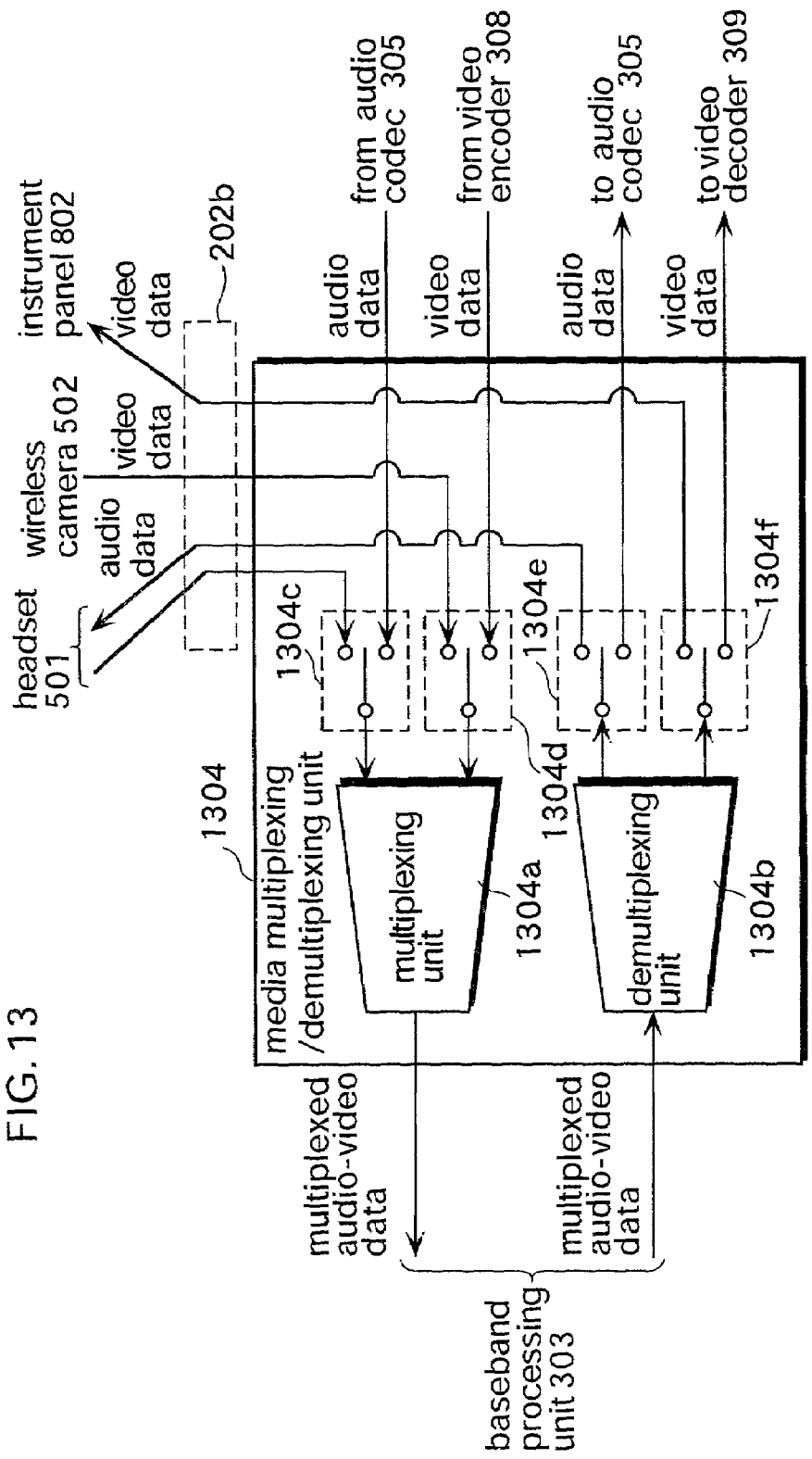
FIG. 13 is a block diagram that shows in detail the structure of a media multiplexing/demultiplexing unit of a video phone terminal according to the third embodiment of the present invention.

The video phone terminal 801 includes a media multiplexing/demultiplexing unit 1304 in FIG. 13 instead of the media multiplexing/demultiplexing unit 204 in FIG. 5. The media multiplexing/demultiplexing unit 1304 includes a multiplexing unit 1304a, a demultiplexing unit 1304b, and first to fourth switching units 1304c to 1304f for multiplexing. The media multiplexing/demultiplexing unit 1304 is a circuit for multiplexing and demultiplexing audio, video, and control data and for controlling the switch the paths of the data as in the case of the media multiplexing/demultiplexing unit 304. The media multiplexing/demultiplexing unit 1304 is different from the media multiplexing/demultiplexing unit 304 in switching the audio data path and the video data path instead of switching the multiplexed audio-video data paths. Note that the component relating to the control data (corresponding to the control part 304e in FIG. 5) is not shown in FIG. 13.

The first switching unit 1304 selects one of audio data that has been transmitted from the headset 501 via the wireless communication interface 202b and audio data from the audio codec 305 of the video phone terminal 801 and outputs the selected audio data to the multiplexing unit 1304a. Similarly, the second switching unit 1304d selects one of video data that has been transmitted from the wireless camera 502 via the wireless communication interface 202b and video data from the video encoder 308 of the video phone terminal 801 and outputs the selected video data to the multiplexing unit 1304a.

On the other hand, the third switching unit 1304e selects one of to send audio data from the demultiplexing unit 1304b to headset 501 via the wireless communication interface 202b and to send the audio data to the audio codec 305 of the video phone terminal 801. Similarly, the fourth switching unit 1304f selects one of to send video data from the demultiplexing unit 1304b to the instrument panel 802 via the wireless communication interface 202b and to send the video data to the video decoder 309 of the video phone terminal 801.

Note that the multiplexing unit 1304a and the demultiplexing unit 1304b have the same functions as the multiplexing unit 304c and the demultiplexing unit 304d in FIG. 5.

According to the connecting status at the first to fourth switching units 1304c to 1304f of the media multiplexing/demultiplexing unit 1304, it is determined whether a group of the microphone 306, the speaker 307, the display 311, and the camera 310 of the video phone terminal 801 or a group of the microphone 603 and the speaker 604 of the headset 501, the display 210, and the wireless camera 502, which all belong to the vehicle, is used as the devices for inputting and outputting sounds and video. Unlike in the first and second embodiments, the instrument panel 802 needs not to include a media multiplexing/demultiplexing unit on behalf of the functions of the first to fourth switching units 1304c to 1304f of the media multiplexing/demultiplexing unit 1304.

Here, an explanation of the operational sequence of the present embodiment will be given.

Figure 14:
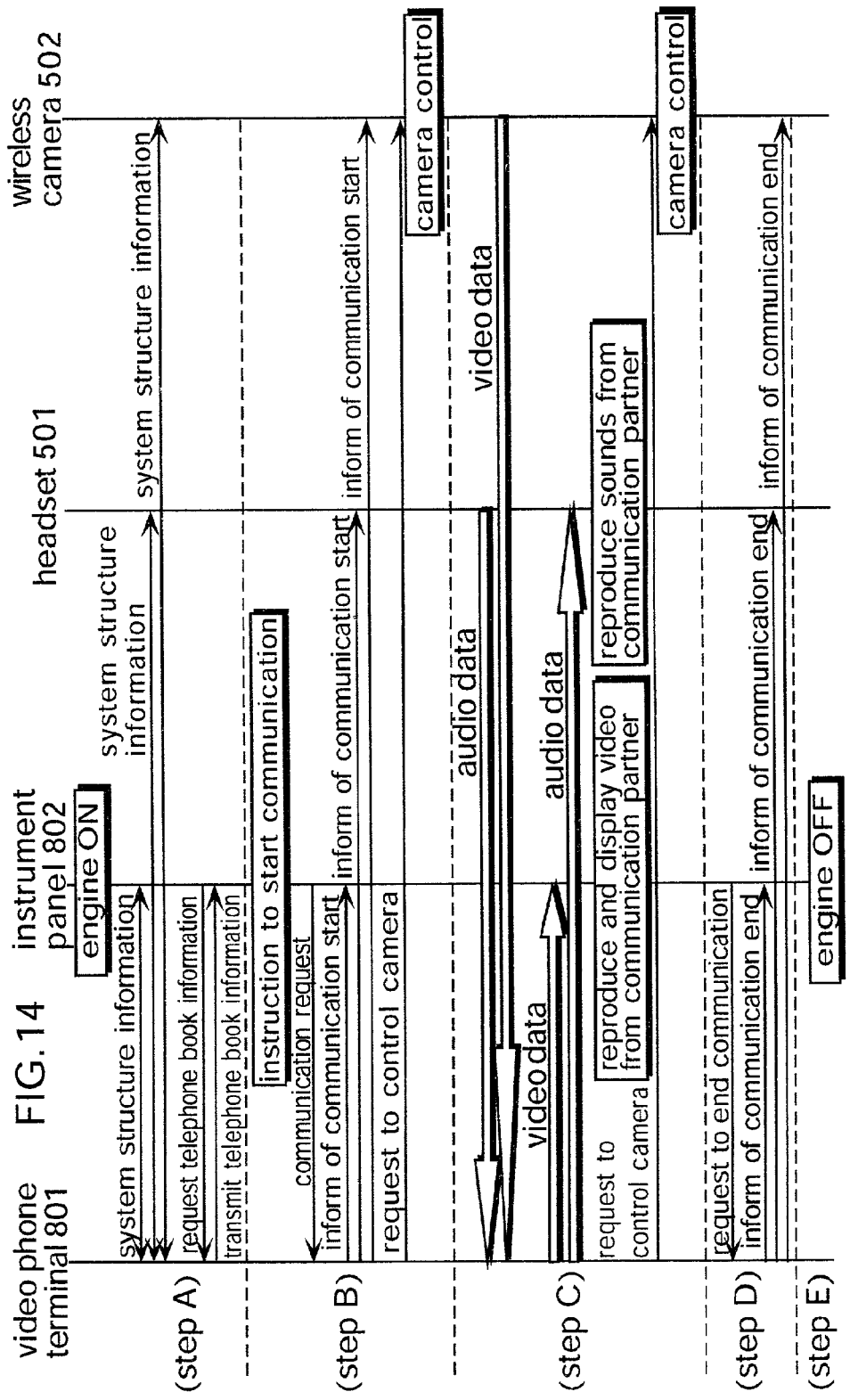
FIG. 14 shows the operational sequence of the on-vehicle handsfree video phone system according to the third embodiment of the present invention.

FIG. 14 shows the operational sequence of the on-vehicle handsfree video phone system according to the third embodiment of the present invention. With reference to FIG. 14, an explanation of the operational sequence will be given below.

(Step A)

When the driver gets in the vehicle and presses a corresponding control button 312 on the video phone terminal 801, the video phone terminal 801 searches for the peripheral devices that are available for communication via the wireless interfaces 202a to 202d. Then, the video phone terminal 801 detects and identifies the instrument panel 802, the wireless camera 502, and the headset 501. In this case, the control units 901, 609, and 606 of the instrument panel 802, the wireless camera 502, and the headset 501 and the control unit 313 of the video phone terminal 801 exchange the information that has been stored in the system information storage units 902, 608, and 605 and the information in the system information storage unit 315 via the wireless communication interfaces 202a to 202d. By doing so, the control units 901, 609, and 606 and the control unit 313 negotiate for using the functions of the wireless camera 502, the headset 501, and the instrument panel 802 instead of the functions of the video phone terminal 801. At the same time, the data in the telephone book that has been stored in the video phone terminal 801 is transmitted to the instrument panel 802 via the wireless communication interfaces 202a and 202b.

(Step B)

Then, when the driver operates control buttons 203 on the instrument panel 802 to select the communication partner and starts the communication, the video phone terminal 801 is informed of the operation via the wireless communication interfaces 202a and 202b. The video phone terminal 801 calls out and completes the connection with the communication partner via the telephone network 314. At the same time, the direction and the zoom of the wireless camera 502 are adjusted for the video phone terminal 801 according to the set information in the system information that has been stored in the system information storage unit 315 of the video phone terminal 801. The same effect can be obtained by signal processing instead of moving the direction of the wireless camera 502, for instance, by cutting out the part of the driver from the video showing the inside of the vehicle.

Also, when a plurality of cameras are connected, the camera at the driver's seat can be selected according to the set information in the system information. Note that the set information can be updated by adjusting the wireless camera 502 using control buttons 203, for instance, and overwriting the newly set status over the system information.

(Step C)

The audio and video data from the headset 501 and the wireless camera 502 are encoded according to the rate adjustment request from the video phone terminal 801 and transmitted to the video phone terminal 801 via the wireless communication interfaces 202a to 202d. Then, after the media multiplex, the audio and video data is sent to the communication partner via the telephone network 314. More specifically, the first switching unit 1304c (and the second switching unit 1304d) of the media multiplexing/demultiplexing unit 1304 of the video phone terminal 801 in FIG. 13 connects the wireless communication interface 202b with the multiplexing unit 1304a according to the instructions from the control unit 313. By doing so, the first switching unit 1304c has the audio data (and the video data) that has been transmitted from the headset 501 (and the wireless camera 502) via the wireless communication interfaces 202b and 202c (and the wireless communication interface 202d) pass through the first switching unit 1304a to be output to the multiplexing unit 1304a.

On the other hand, the audio and video data that has been sent from the communication partner are demultiplexed in the video phone terminal 801. After that, the audio data is transmitted to the headset 501 and the video data to the instrument panel 802 via the wireless communication interfaces 202a to 202c to be reproduced and displayed. More specifically, the third switching unit 1304e (and the fourth switching unit 1304f) of the media multiplexing/demultiplexing unit 1304 of the video phone terminal 801 in FIG. 13 connects the demultiplexing unit 1304b with the wireless communication interface 202b according to the instructions from the control unit 313. By doing so, the third switching unit 1304e (and the fourth switching unit 1304f) outputs the demultiplexed audio data (and the demultiplexed video data) to the headset 501 (and the instrument panel 802).

Note that the video that has been taken by the wireless camera 502 can be displayed by the display 210 in order to acknowledge the same video that is to be sent to the communication partner. Also, the direction and the zoom of the wireless camera 502 can be controlled according to the camera control request from the communication partner.

(Step D)

Control buttons 203 on the instrument panel 802 are operated when the communication is completed. Then, a call disconnect signal is sent to the switchboard via the video phone terminal 801 and the telephone network 314 to disconnect the communication.

On the other hand, when an incoming call is received, the instrument panel 802 is called via the telephone network 314, the video phone terminal 801, and the wireless communication interfaces 202a and 202b to be informed of the incoming call. The instrument panel 802 displays the information on the sender of the incoming call. Then, the communication becomes available by the same operations as in the case of sending an outgoing call. The same can be said when the communication is disconnected by the incoming call sender.

(Step E)

The communication between the video phone terminal 801 and the instrument panel 802 becomes unavailable when the driver turns the key OFF or brings the video phone terminal 801 out of the vehicle, for instance. In this case, the handsfree status is cancelled, and the video phone terminal 801 and the instrument panel 802 returns to the original status.

As has been described, a handsfree video phone system using the in-car environment (the devices that belong to the vehicle) that has been designed for easy and safe operation is realized just by bringing the video phone terminal 801 into the vehicle without selecting and adjusting the wireless camera 502 according to the present embodiment.

In the present embodiment, the explanation has been given on the assumption that the camera set information is included in the system information that is stored in the system information storage unit 315 of the video phone terminal 802. Note that the camera set information may be stored in the system information storage unit 608 of the wireless camera 502.

Also, the explanation has been given on the assumption that the wireless camera 502, the headset 501, and the instrument panel 802 include the video encoder 208, the camera unit 607, the video decoder 209, the display 210, the audio codec 207, the microphone 603, and the speaker 604 and the functions of these devices are used in the present embodiment. Instead, the functions of some of these devices may be replaced by functions of the video phone terminal 106.

(The Fourth Embodiment)

Here, an explanation of the on-vehicle handsfree video phone system according to the fourth embodiment will be given with reference to figures.

Figure 15:
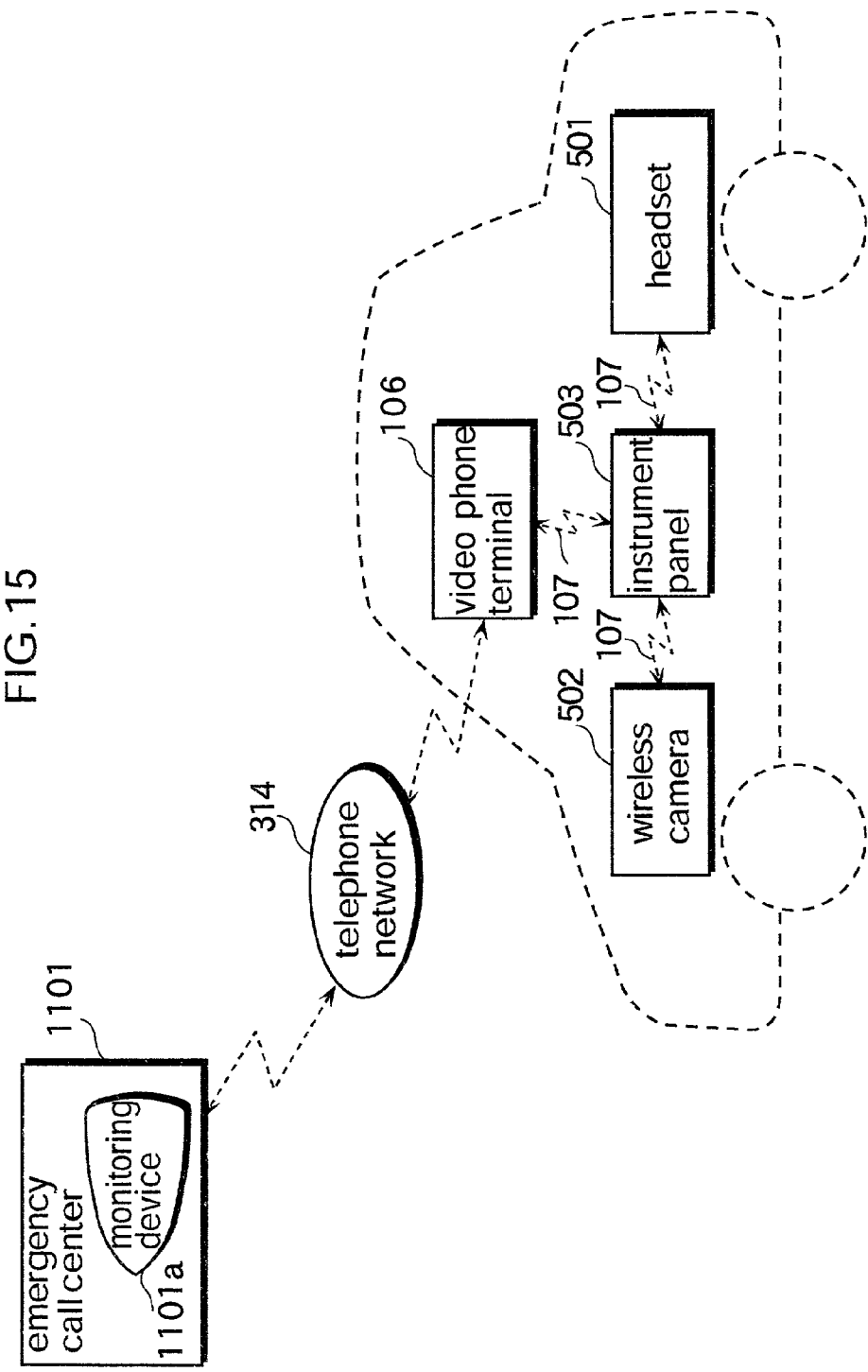
FIG. 15 shows the structure of an emergency call system using an on-vehicle handsfree video phone system according to the fourth embodiment of the present invention.

FIG. 15 shows the structure of an emergency call system using the on-vehicle handsfree video phone system according to the fourth embodiment of the present invention. The emergency call system includes an emergency call center 1101 and a handsfree video phone system (in which a video phone terminal 106, a headset 501, and a wireless camera 502 are connected with an instrument panel 503 via a wireless communication medium 107), which are connected with each other via a telephone network 314.

An explanation of the emergency call system will be given below.

The emergency call center 1101 has a monitoring device 1101a for audio and video communication with the video phones 106 via the telephone network 314. The users of the video phones 106 have been registered in advance. The emergency call center 1101 administers the mobile phone numbers, names, and the information of the vehicles (such as the license numbers and vehicle types) of the registered users as the attribute information of the users. On the other hand, the video phone terminals 106 store the telephone number of the emergency call center.

Here, for instance, when an emergency call becomes necessary due to an accident or sudden illness, the driver or a fellow passenger presses the emergency call button on the instrument panel 503, the video phone 106 calls out the emergency call center 1101 via the telephone network 314. Of course, a call may be made to the emergency call center 1101 without the driver's operation. For instance, a call is given when a clash is detected with a clash sensor or airbag inflation is detected. Then, the set of the wireless camera 502 is changed so as to take the whole inside scene of the vehicle. After the connection is built, handsfree communication between the vehicle and the emergency call center 1101 becomes available. On the other hand, the wireless camera 502 can be controlled from the emergency call center 1101. For instance, the zooming or panning can be controlled. As a result, the inside state of the vehicle can be known with sounds and video.

Figure 16B:
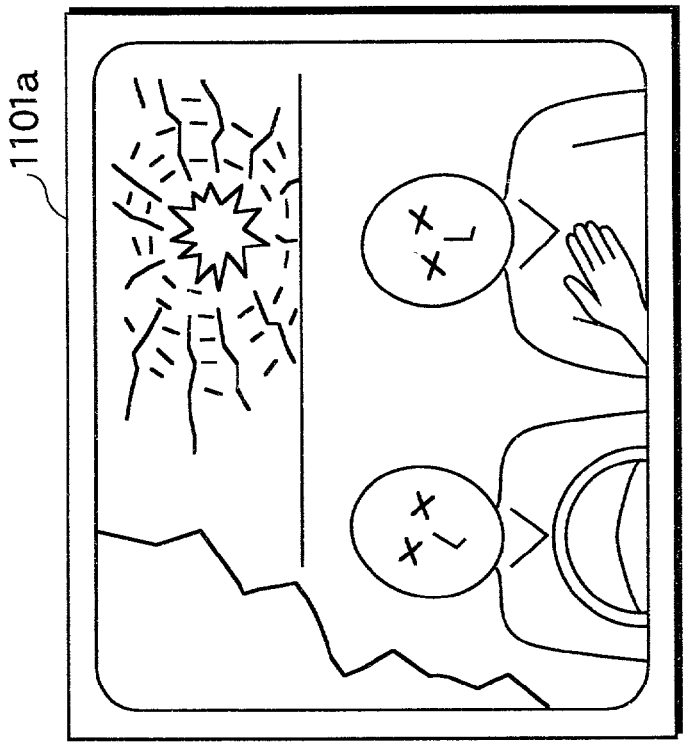
FIG. 16B is a display example showing the inside of the vehicle of the communication partner on the screen of a monitoring device in the emergency call center of the emergency call system according to the fourth embodiment of the present invention.
Figure 16A:
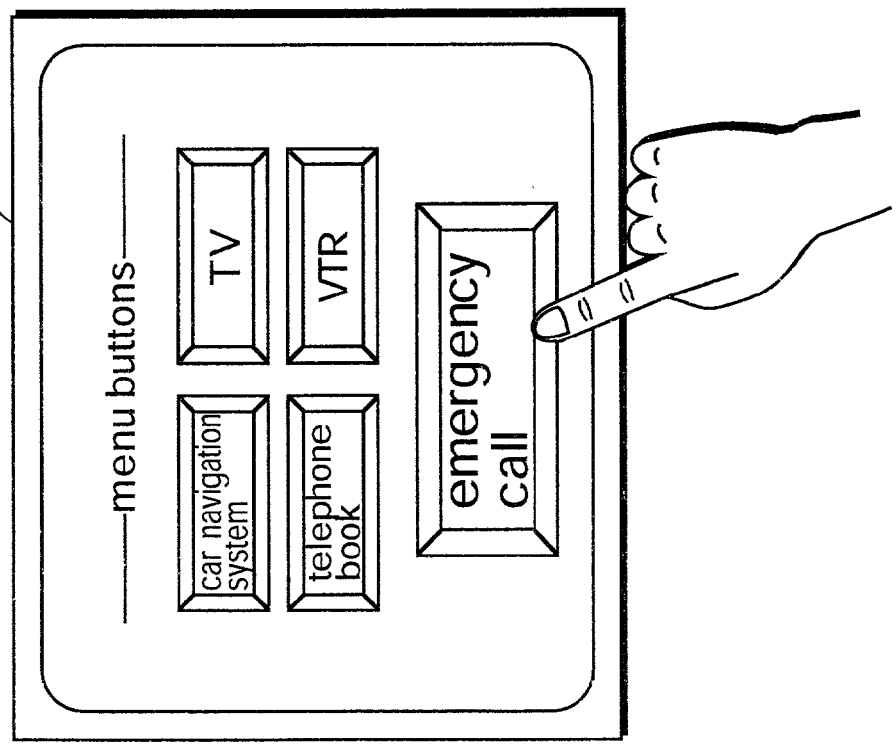
FIG. 16A is a display example of menu buttons on the screen of a car instrument panel of the emergency call system according to the fourth embodiment of the present invention.

FIGS. 16A and 16B are display examples of a screen in this emergency call system. FIG. 16A is a display example on the screen of the display 210 of the car instrument panel 503. FIG. 16B is a display example on the screen of the monitoring device 1101a in the emergency call center 1101. As shown in FIG. 16A, the driver (a registered user) is able to establish communication with the emergency call center 1101 in an emergency using sounds and video only by pressing the emergency call button on the screen of the display 210 of the instrument panel 503. Also, as shown in FIG. 16B, the inside state of the vehicle can be monitored from the emergency call center 1101 and a conversation can be held between the emergency call center 1101 and the vehicle driver.

As has been described, a handsfree communication can be established with the emergency call center 1101, inside video of the vehicle can be sent to the communication partner, and the camera can be controlled by the communication partner in an emergency according to the present embodiment. The same structure can be applied to real time transmission of video of the scene ahead of the vehicle to a specific receiver while driving and recording of the video by the receiver.

In each of the first to fourth embodiments, a wireless communication technology, Bluetooth and an infrared communication technology, IrDA can be used as the wireless communication interfaces 202a to 202d, which have been used for connecting the video phone terminal 106 or 801, the headset 501, the wireless camera 502, and the instrument panel 105, 503, or 802 with each other. Note that when at least one of the connections is the wireless connection, the remaining connections may use a medium such as wire USB, IEEE1394, and the bus that realizes the same function instead of a wireless medium.

Also, in each of the embodiments, when the communication partner is not compatible with the video phone and only the audio communication is available, the functions of the camera may not be used. In this case, the handsfree system may be only used for audio communication.

In addition, the explanation has been given in each of the embodiments by taking the video phone terminal as the example. The same effects, however, can be obtained by an ordinary mobile phone that does not have the video phone functions, only if the mobile phone is equipped with the system information storage unit and the wireless communication interface and can operate as the handsfree video phone system with the peripheral devices such as the camera and the headset.

More specifically, peripheral devices such as the microphone, the speaker, the camera, and the display that belong to the vehicle can replace the peripheral devices that have been built in the mobile phone which has been brought into the vehicle. Moreover, the peripheral devices that have not been built in the mobile phone may be complemented by peripheral devices that belong to the vehicle. For instance, when the built-in camera is out of order or no camera has been built in a mobile phone, a camera that belongs to the vehicle can be used as the complement to send the inside video of the vehicle to the communication partner. For instance, even if the camera 310 of the video phone terminal 106 in the first embodiment is out of order or the camera 310 is removed, when the first switching unit 304a of the media multiplexing/demultiplexing unit 304 in FIG. 5 has the multiplexed audio-video data from the instrument panel 105 pass the baseband processing unit 303, the inside video of the vehicle can be sent to the communication partner.

Furthermore, the telephone number of the receiver of a call is selected from the telephone numbers and the telephone book stored in the video phone terminal 106 in the first to fourth embodiments. The storage place of the telephone numbers and the telephone book is not limited to the video phone terminal 106. The telephone numbers and the telephone book may be stored in, for instance, the instrument panel. In this case, the control procedure may be as follows. When the user designates one out of the telephone numbers that have been stored in the instrument panel, the instrument panel informs the video phone terminal 106 of the designated telephone number and has the video phone terminal 106 call out.

In each of the first to fourth embodiments, the explanation has been given by taking the instrument panel as the example. The same functions, however, may be realized by mounting the functions that correspond to the car navigation system or the car multi media display system. In terms of operation, the explanation of the operation has been given using the display on the screen of the instrument panel and the control buttons. An audio recognition processing unit may be included in the instrument panel or the headset and the operation may be input according to the sounds that are input with the microphone.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. An on-vehicle handsfree system comprising a car device and a mobile terminal, wherein the car device comprises:

at least two of a microphone, a speaker, a camera, and a display as car peripheral units, a first communication interface operable to enable wireless communication with the mobile terminal, and an attribute information notification unit operable to notify the mobile terminal of attribute information via the first communication interface, the attribute information for identifying the car peripheral units;

wherein the mobile terminal is operable to communicate by at least one of wireless video communication and wireless audio communication via a communication network, and comprises:

at least two of a microphone, a speaker, a camera, and a display as mobile terminal peripheral units, a second communication interface operable to enable the wireless communication with the car device, an attribute information obtaining unit operable to obtain the attribute information from the car device via the second communication interface, and a replacement controller operable to select at least two of the mobile terminal peripheral units according to the obtained attribute information, and operable to cause respective ones of the car peripheral corresponding to the selected mobile terminal peripheral units to replace the selected mobile terminal peripheral units, so that the corresponding car peripheral units are simultaneously used as the selected mobile terminal peripheral units; wherein the car device includes the camera, wherein the mobile terminal further includes:
a storage unit operable to store camera set information on a shot condition for the camera; and
a camera set information notification unit operable to transmit the camera set information to the car device via the second communication interface, and
wherein the car device further includes a camera controller that controls the camera according to the shot condition in the camera set information.

2. The on-vehicle handsfree system according to claim 1, wherein the replacement controller cuts off a first data path that connects a channel of the wireless communication with the mobile terminal peripheral units and establishes a second data path through the first and second communication interfaces that connect the wireless communication channel with the car device.

3. The on-vehicle handsfree system according to claim 2, wherein the first and second data paths transmit multiplexed audio-video data.

4. The on-vehicle handsfree system according to claim 2, wherein the first and second data paths transmit one of audio data and video data.

5. The on-vehicle handsfree system according to claim 1, wherein the car device includes the camera, and
wherein the car device further includes:
a storage unit operable to store camera set information on a shot condition for the camera, the camera set information corresponding to respective ones of a plurality of mobile terminals; and
a camera controller operable to read a piece of camera set information corresponding to one of the mobile terminals that has been brought into a vehicle, and operable to control the camera according to the shot condition in the camera set information.

6. The on-vehicle handsfree system according to claim 1, wherein the mobile terminal further includes a status switching unit that switches between a handsfree video phone operation status in which the replacement controller functions and a stand alone operation status in which no replacement controller functions according to an operation of an engine key.

7. The on-vehicle handsfree system according to claim 1, further comprising a status switching unit operable to switch between a handsfree video phone operation status in which the replacement controller functions and a stand alone operation status in which no replacement controller functions according to a user operation of one of the mobile terminal and the car device.

8. The on-vehicle handsfree system according to claim 1, further comprising a status switching unit operable to switch between a handsfree video phone operation status in which the replacement controller functions and a stand alone operation status in which no replacement controller functions according to a communication link status between the car device and the mobile terminal by the first and second communication interfaces.

9. The on-vehicle handsfree system according to claim 1, further comprising:
a holding unit operable to hold the mobile terminal; and
a status switching unit operable to switch between a handsfree video phone operation status in which the replacement controller functions and a stand alone operation status in which no replacement controller functions according to whether the holding unit holds the mobile terminal.

10. The on-vehicle handsfree system according to claim 1, wherein the car device includes a plurality of cameras,
wherein the camera controller is operable to select, from the cameras, a camera at a driver's seat according to the camera set information, and
wherein the mobile terminal is operable to transmit video shot by the camera selected by the camera controller by wireless communication via the communication network.

11. The on-vehicle handsfree system according to claim 10,
wherein the camera controller includes a signal processing unit operable to cut out an image showing the driver from the video, shot by the camera, showing a whole inside of a vehicle, and
wherein the mobile terminal is operable to transmit the images showing the driver cut out by the signal processing unit by wireless communication via the communication network.

12. An on-vehicle handsfree system comprising a car device and a mobile terminal,
wherein the car device comprises:
at least two of a microphone, a speaker, a camera, and a display as car peripheral units,
a first communication interface operable to enable wireless communication with the mobile terminal, and
an attribute information notification unit operable to notify the mobile terminal of attribute information via the first communication interface, the attribute information for identifying the car peripheral units;
wherein the mobile terminal is operable to communicate by at least one of wireless video communication and wireless audio communication via a communication network, and comprises:
at least two of a microphone, a speaker, a camera, and a display as mobile terminal peripheral units,
a second communication interface operable to enable the wireless communication with the car device,
an attribute information obtaining unit operable to obtain the attribute information from the car device via the second communication interface, and
a complement controller operable to select at least two of the mobile terminal peripheral units that are not included in the mobile terminal according to the obtained attribute information, and operable to cause the selected mobile terminal peripheral units that are not included in the mobile terminal to be complemented by corresponding ones of the car peripheral units, so that the corresponding car peripheral units are simultaneously used as the selected mobile terminal peripheral units,
wherein the car device includes the camera,
wherein the mobile terminal further includes:
a storage unit operable to store camera set information on a shot condition for the camera; and
a camera set information notification unit operable to transmit the camera set information to the car device via the second communication interface, and
wherein the car device further includes a camera controller that controls the camera according to the shot condition in the camera set information.

13. The on-vehicle handsfree system according to claim 12,
wherein the camera set information corresponds to respective ones of a plurality of mobile terminals; and wherein the camera controller is operable to read a piece of camera set information corresponding to one of the mobile terminals that has been brought into a vehicle.

14. The on-vehicle handsfree system according to claim 12, wherein the mobile terminal further includes a status switching unit operable to switch between a handsfree video phone operation status in which the complement controller functions and a stand alone operation status in which no complement controller functions according to an operation of an engine key.

15. The on-vehicle handsfree system according to claim 12, further comprising a status switching unit operable to switch between a handsfree video phone operation status in which the complement controller functions and a stand alone operation status in which no complement controller functions according to a user operation of one of the mobile terminal and the car device.

16. The on-vehicle handsfree system according to claim 12, further comprising a status switching unit operable to switch between a handsfree video phone operation status in which the complement controller functions and a stand alone operation status in which no complement controller functions according to a communication link status between the car device and the mobile terminal by the first and second communication interfaces.

17. The on-vehicle handsfree system according to claim 12, further comprising:
a holding unit operable to hold the mobile terminal; and
a status switching unit operable to switch between a handsfree video phone operation status in which the complement controller functions and a stand alone operation status in which no complement controller functions according to whether the holding unit holds the mobile terminal.

18. The on-vehicle handsfree system according to claim 12,
wherein the car device includes a microphone, a speaker, a camera, and a display as the car peripheral units,
wherein the mobile terminal peripheral units include a microphone, a speaker, a camera, and a display, and
wherein the complement controller is operable to cause the mobile terminal peripheral units to be complemented by the corresponding car peripheral units, so that the microphone, speaker, camera, and display included in the car device are simultaneously used respectively as the microphone, speaker, camera, and display included in the mobile terminal peripheral units.

19. The on-vehicle handsfree system according to claim 12,
wherein the complement controller is operable to cause mobile terminal peripheral units, out of the mobile terminal peripheral units included in the mobile terminal, to be complemented by corresponding ones of the car peripheral units, each of the mobile terminal peripheral units to be complemented being out of order, or being removed from the mobile terminal.

20. The on-vehicle handsfree system according to claim 12,
wherein the car device includes a plurality of cameras,
wherein the camera controller is operable to select, from the cameras, a camera at a driver's seat according to the camera set information, and
wherein the mobile terminal is operable to transmit video shot by the camera selected by the camera controller by wireless communication via the communication network.

21. The on-vehicle handsfree system according to claim 20,
wherein the camera controller includes a signal processing unit operable to cut out an image showing the driver from the video, shot by the camera, showing a whole inside of a vehicle, and
wherein the mobile terminal is operable to transmit the image showing the driver cut out by the signal processing unit by wireless communication via the communication network.

22. A mobile terminal for at least one of wireless video communication and wireless audio communication via a communication network, the mobile terminal comprising:
at least two of a microphone, a speaker, a camera, and a display as mobile terminal peripheral units;
a communication interface operable to enable the wireless communication with a car device that includes at least two of a microphone, a speaker, a camera, and a display as car peripheral units;
an attribute information obtaining unit operable to obtain attribute information for identifying the car peripheral units from the car device via the communication interface; and
a replacement controller operable to select at least two of the mobile terminal peripheral units according to the obtained attribute information, and operable to cause respective ones of the car peripheral units corresponding to the selected mobile terminal peripheral units to replace the selected mobile terminal peripheral units, so that the corresponding car peripheral units are simultaneously used as the selected mobile terminal peripheral units;
wherein the car device includes the camera,
wherein the mobile terminal further includes:
a storage unit operable to store camera set information on a shot condition for the camera; and
a camera set information notification unit operable to transmit the camera set information to the car device via the second communication interface, and
wherein the car device controls the camera according to the shot condition in the camera set information.

23. A mobile terminal for at least one of wireless video communication and wireless audio communication via a communication network, the mobile terminal comprising:
at least two of a microphone, a speaker, a camera, and a display as mobile terminal peripheral units;
a communication interface operable to enable the wireless communication with a car device that includes at least two of a microphone, a speaker, a camera, and a car display as car peripheral units;
an attribute information obtaining unit operable to obtain attribute information for identifying the car peripheral units from the car device via the communication interface; and
a complement controller operable to select at least two of the mobile terminal peripheral units that are not included in the mobile terminal according to the obtained attribute information, and operable to cause the selected mobile terminal peripheral units that are not included in the mobile terminal to be complemented by corresponding ones of the car peripheral units, so that the corresponding car peripheral units are simultaneously used as the selected mobile terminal peripheral units,
wherein the car device includes the camera,
wherein the mobile terminal further comprises:

a storage unit operable to store camera set information on a shot condition for the camera; and a camera set information notification unit operable to transmit the camera set information to the car device via the communication interface, and wherein the car device controls the camera according to the shot condition in the camera set information.

24. The on-vehicle handsfree system according to claim 1, wherein the car device includes a microphone, a speaker, a camera, and a display as the car peripheral units, wherein the mobile terminal peripheral units include a microphone, a speaker, a camera, and a display, and wherein the replacement controller is operable to cause the car peripheral units corresponding to the mobile terminal peripheral units to replace the mobile terminal peripheral units, so that the microphone, speaker, camera, and display included in the car device are simultaneously used respectively as the microphone, speaker, camera, and display included in the mobile terminal peripheral units.

\* \* \* \* \*